United States Patent
Zhang

(10) Patent No.: US 12,190,721 B2
(45) Date of Patent: Jan. 7, 2025

(54) SYSTEM, METHOD AND APPARATUS SUPPORTING NAVIGATION

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 101 days.

(21) Appl. No.: 17/169,197

(22) Filed: Feb. 5, 2021

(65) Prior Publication Data

US 2021/0256842 A1 Aug. 19, 2021

Related U.S. Application Data

(60) Provisional application No. 62/976,954, filed on Feb. 14, 2020.

(51) Int. Cl.
*G08G 1/01* (2006.01)
*B60W 40/04* (2006.01)
*B60W 40/06* (2012.01)
*H04W 4/46* (2018.01)

(52) U.S. Cl.
CPC ........... *G08G 1/0145* (2013.01); *B60W 40/04* (2013.01); *B60W 40/06* (2013.01); *G08G 1/0133* (2013.01); *H04W 4/46* (2018.02); *B60W 2555/20* (2020.02)

(58) Field of Classification Search
None
See application file for complete search history.

(56) References Cited

U.S. PATENT DOCUMENTS

| 9,646,496 B1* | 5/2017 | Miller ............... H04W 4/029 |
| 2001/0034239 A1 | 10/2001 | Yamato et al. |
| 2002/0025824 A1 | 2/2002 | Lin |
| 2004/0198386 A1 | 10/2004 | Dupray |

(Continued)

FOREIGN PATENT DOCUMENTS

| CN | 101239626 A | 8/2008 |
| CN | 102098778 A | 6/2011 |

(Continued)

OTHER PUBLICATIONS

3GPP TS 38.305, V15.4.0, 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, 72 pages.

(Continued)

*Primary Examiner* — Adam D Tissot
*Assistant Examiner* — Charles Pall

(57) ABSTRACT

Methods and System for enhanced navigation and traffic management are provided. A controller obtains input indicative of conditions on a physical road, traffic status information associated with the physical road and requirements of a mobile device. Based at least in part on the input, one or more virtual lanes defining respective routes along the physical road are determined. The virtual lanes are communicated to mobile devices which follow them in place of painted lanes. The virtual lanes can be dynamically updated for example to avoid obstacles. Different lanes can correspond to different priorities of traffic.

20 Claims, 16 Drawing Sheets

(56) References Cited

U.S. PATENT DOCUMENTS

| | | | |
|---|---|---|---|
| 2008/0064380 | A1 | 3/2008 | Niemenmaa et al. |
| 2008/0242374 | A1 | 10/2008 | Alexander |
| 2008/0261612 | A1 | 10/2008 | Mia et al. |
| 2011/0060807 | A1 | 3/2011 | Martin et al. |
| 2012/0154286 | A1 | 6/2012 | Lim et al. |
| 2012/0315903 | A1 | 12/2012 | Yoshimura et al. |
| 2015/0226577 | A1 | 8/2015 | Le Grand et al. |
| 2016/0307442 | A1 | 10/2016 | Relyea et al. |
| 2017/0371337 | A1* | 12/2017 | Ramasamy ............ G08G 1/056 |
| 2018/0089994 | A1 | 3/2018 | Dhondse et al. |
| 2018/0247138 | A1 | 8/2018 | Kang |
| 2018/0262903 | A1 | 9/2018 | Ryan et al. |
| 2019/0035280 | A1* | 1/2019 | Kim ........................ G08G 1/167 |
| 2019/0078897 | A1 | 3/2019 | Sumizawa |
| 2019/0384293 | A1* | 12/2019 | Yoo ........................ B60W 30/10 |
| 2020/0068481 | A1 | 2/2020 | Kim et al. |
| 2020/0296680 | A1 | 9/2020 | Akkarakaran et al. |
| 2020/0410260 | A1* | 12/2020 | Choe ..................... B60W 40/02 |
| 2021/0018916 | A1* | 1/2021 | Thakur ..................... G07C 5/08 |
| 2021/0120517 | A1 | 4/2021 | Akkarakaran et al. |
| 2021/0160810 | A1 | 5/2021 | Zhang et al. |
| 2021/0250732 | A1 | 8/2021 | Zhang |
| 2021/0407290 | A1* | 12/2021 | Oba ..................... B60W 60/0053 |
| 2022/0013008 | A1* | 1/2022 | Katz ........................ G08G 1/08 |

FOREIGN PATENT DOCUMENTS

| | | | |
|---|---|---|---|
| CN | 104244404 | A | 12/2014 |
| CN | 104796865 | A | 7/2015 |
| CN | 106646573 | A | 5/2017 |
| CN | 107121980 | A | 9/2017 |
| CN | 107222894 | A | 9/2017 |
| CN | 109451580 | A | 3/2019 |
| CN | 109813332 | A | 5/2019 |
| CN | 109842934 | A | 6/2019 |
| EP | 3190426 | A1 | 7/2017 |
| EP | 3240311 | A1 | 11/2017 |
| EP | 3352486 | A1 | 7/2018 |
| JP | 2002518684 | A | 6/2002 |
| JP | 2018197964 | A * | 12/2018 |
| KR | 20050017046 | A | 2/2005 |
| WO | 2012099828 | A1 | 7/2012 |
| WO | 2019027245 | A1 | 2/2019 |

OTHER PUBLICATIONS

3GPP TS 23.273 V16.1.0, 3rd Generation Partnership Project; Technical Specification Group Services and System Aspects; 5G System (5GS) Location Services (LCS); Stage 2(Release 16), Sep. 2019, 90 pages.

N4: "Clarifications on GSM vs. UMTS specific parts", 3GPP Draft; 23007-005, 3rd Generation Partnershipproject (3GPP), Mobile Competence Centre;650, Route Des LUCIOLES;F-06921 Sophia-Antipolis Cedex France, vol. TSG CN, No. Dusseldorf, Germany; Jul. 19, 2000, Jul. 19, 2000(Jul. 19, 2000), XP050047730, total:7pages.

R3: "Correction to LMU Information Signaling", 3GPP Draft; R3 122308, 3rd Generation Partnership Project (3GPP), Mobile Competence Centre;650, Route Des Lucioles;F-06921 Sophia-Antipolis Cedex France vol. RAN WG3 Sep. 29, 2012 (Sep. 29, 2012), XP050670136, total:6pages.

* cited by examiner

SYSTEM, METHOD AND APPARATUS SUPPORTING NAVIGATION

CROSS-REFERENCE TO RELATED APPLICATIONS

This application claims the benefit of priority to the U.S. Patent Application having Ser. No. 62/976,954 and entitled "SYSTEM, METHOD AND APPARATUS SUPPORTING NAVIGATION" filed Feb. 14, 2020, which is hereby incorporated by reference in its entirety.

FIELD OF THE INVENTION

The present invention pertains to the field of wireless communication and in particular to a method, apparatus and system for facilitating navigation, for example, of vehicles.

BACKGROUND

Self-driving systems, such as self-driving cars, rely on sensors to obtain relevant and timely data required for facilitating effective navigation. Sensors generate data indicative of driving conditions and relay the generated data to self-driving systems for navigation purposes. However, sensors may be unable to generate data or even reliable data in all circumstances, particularly when driving conditions are subject to change. Availability of and accessibility to reliable data is particularly important for an effective response to changing driving conditions. Lack of relevant and timely data can render self-driving systems less useful. Accordingly, the effectiveness of self-driving systems becomes notably dependent on the system's response to changing driving conditions.

Therefore, there is a need for a method, apparatus and system for facilitating navigation of mobile devices, for example vehicles, that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system, method and apparatus for facilitating navigation of mobile devices, for example vehicles, which may be operatively coupled to a wireless network.

An aspect of the disclosure provides for a method for implementation by a controller. The controller including a computer processor executing instructions stored in memory. The method includes obtaining input indicative of one or more of: conditions on a physical road, traffic status information associated with the physical road and requirements of a mobile device. The method further includes determining, based at least in part on the input, one or more virtual lanes defining respective routes along the physical road, at least one of the virtual lanes to be followed by the mobile device. The method further includes communicating an indication of the determined one or more virtual lanes to the mobile device. The method may provide for enhanced navigation and traffic management via determining routes based on road conditions, traffic information and requirements of mobile device.

In some embodiments, the indication of the determined one or more virtual lanes is communicated as part of a dynamically updated electronic map. The method may further enhance navigation and traffic management via dynamically updating the routes.

In some embodiments, the indication of the determined one or more virtual lanes includes one or more usage requirements for at least one of the virtual lanes. The method may further enhance navigation and traffic management via allocating usage requirements for the determined lanes.

In some embodiments, the indication of at least one of the virtual lanes includes a list of location coordinates to be followed.

In some embodiments, the indication includes an indication associated with at least one of the location coordinates that a mobile device is permitted to change between virtual lanes when at said at least one of the location coordinates. The method may further enhance navigation and traffic management by recommending route changes for improving route efficiency.

In some embodiments, the method further includes dynamically adjusting the one or more virtual lanes in response to further input obtained following said input, the further input indicative of one or more of: subsequent conditions on the physical road, subsequent traffic status information associated with the physical road, and subsequent requirements of the mobile device. The method may further enhance navigation and traffic management by adjusting routes based on real-time and predicted information.

In some embodiments, the method further includes configuring a virtual traffic control signal for controlling traffic at an intersection involving at least one of the virtual lanes. In some embodiments, the method further includes communicating an indication of the virtual traffic control signal to the mobile device. The method may further enhance navigation and traffic management by controlling traffic for improved route efficiency.

In some embodiments, the input indicative of conditions on the physical road is received from a manager responsible for management of the physical road, and the input includes one or more of: physical layout of the road, quality of the road, and weather-dependent road conditions. The method may further enhance navigation and traffic management by determining routes based on road conditions.

In some embodiments, the method further includes receiving additional input indicative of requirements of one or more additional mobile devices. In some embodiments, the input indicative of the requirements of the mobile device and the additional input is received from a single customer responsible for the mobile device and the additional mobile devices. In some embodiments, the one or more lanes are determined based at least in part on the additional input. The method may further enhance traffic management by determining routes of multiple mobile devices and further reduce overhead signalling.

In some embodiments, the input and the additional input indicates one or more of a schedule, and a service level for the mobile device and the additional mobile devices.

In some embodiments, the method further includes performing a registration operation for the mobile device, the registration operation including obtaining the requirements of the mobile device.

In some embodiments, the requirements of the mobile device include one or more of: a service quality, a planned travel path, and a transportation schedule. In some embodiments, the method further includes communicating, to the mobile device, one or more usage requirements for at least one of the virtual lanes and a time window during which the virtual lanes can be used. The method may further enhance navigation and traffic management by allocating a customized road use based on the various requirements.

In some embodiments, the method further includes receiving one or more event reports from the mobile device. In some embodiments, the received event reports triggers a redetermination of the one or more virtual lanes and a communication, to the mobile device, of the redetermination of the one or more virtual lanes. The method may further enhance navigation and traffic management by redetermining routes based on updated road and traffic information.

In some embodiments, the traffic status information is received from one or more stationary monitors deployed along the physical road. In some embodiments, the traffic status information is determined based on information from the one or more monitors. In some embodiments, the conditions are indicative of traffic conditions on the physical road.

In some embodiments, the traffic status information includes one or more of: traffic congestion conditions and occurrence of an obstacle. The method may further enhance navigation and traffic management by determining routes free of traffic congestion and obstacles.

In some embodiments, the obtaining input and the communicating with the mobile device is performed via a wireless access network. In some embodiments, the indication of the determined one or more virtual lanes is communicated as part of a dynamically updated electronic map. In some embodiments, the wireless access network is configured to perform one or more of: repeatedly multicasting the indication of the electronic map to a plurality of mobile devices including the mobile device, forwarding registration messages between the mobile device and the controller, and communicating event reports from the mobile device to the controller.

In some embodiments, the obtaining traffic status information is performed via a wireless access network via assigned wireless resources. The method may further enhance navigation and traffic management by continuously updating the routes based on changing traffic and road conditions.

Another aspect of the disclosure provides for a controller including a processor, a memory and a communication interface. The controller configured to obtain input indicative of one or more of: conditions on a physical road, traffic status information associated with the physical road, and requirements of a mobile device. The controller further configured to determine, based at least in part on the input, one or more virtual lanes defining respective routes along the physical road, at least one of the virtual lanes to be followed by the mobile device. The controller further configured to communicate an indication of the determined one or more virtual lanes to the mobile device. The controller may provide for enhanced navigation and traffic management via determining routes based on road conditions, traffic information and requirements of mobile device.

In some embodiments, the indication of the determined one or more virtual lanes is communicated as part of a dynamically updated electronic map. The controller may further enhance navigation and traffic management via dynamically updating the routes.

In some embodiments, the indication of the determined one or more virtual lanes includes one or more usage requirements for at least one of the virtual lanes. The controller may further enhance navigation and traffic management via allocating usage requirements for the determined lanes.

In some embodiments, the indication of at least one of the virtual lanes includes a list of location coordinates to be followed.

In some embodiments, the indication includes an indication associated with at least one of the location coordinates that a mobile device is permitted to change between virtual lanes when at said at least one of the location coordinates. The controller may further enhance navigation and traffic management by recommending route changes for improving route efficiency.

In some embodiments, the controller is further configured to dynamically adjust the one or more virtual lanes in response to further input obtained following said input, the further input indicative of one or more of: subsequent conditions on the physical road, subsequent traffic status information associated with the physical road, and subsequent requirements of the mobile device. The controller may further enhance navigation and traffic management by adjusting routes based on real-time and predicted information.

In some embodiments, the controller is further configured to configure a virtual traffic control signal for controlling traffic at an intersection involving at least one of the virtual lanes. In some embodiments, the controller is further configured to communicate an indication of the virtual traffic control signal to the mobile device. The controller may further enhance navigation and traffic management by controlling traffic for improved route efficiency.

In some embodiments, the input indicative of conditions on the physical road is received from a manager responsible for management of the physical road, and the input includes one or more of: physical layout of the road, quality of the road, and weather-dependent road conditions. The controller may further enhance navigation and traffic management by determining routes based on road conditions.

In some embodiments, the controller is further configured to receive additional input indicative of requirements of one or more additional mobile devices. In some embodiments, the input indicative of the requirements of the mobile device and the additional input is received from a single customer responsible for the mobile device and the additional mobile devices. In some embodiments, the one or more lanes are determined based at least in part on the additional input. The controller may further enhance traffic management by determining routes of multiple mobile devices and further reduce overhead signalling.

In some embodiments, the input and the additional input indicates one or more of: a schedule, and a service level for the mobile device and the additional mobile devices.

In some embodiments, the controller is further configured to perform a registration operation for the mobile device, the registration operation including obtaining the requirements of the mobile device.

In some embodiments, the requirements of the mobile device include one or more of: a service quality, a planned travel path, and a transportation schedule. In some embodiments, the controller is further configured to communicate, to the mobile device, one or more usage requirements for at least one of the virtual lanes and a time window during which the virtual lanes can be used. The controller may further enhance navigation and traffic management by allocating a customized road use based on the various requirements.

In some embodiments, the controller is further configured to receive one or more event reports from the mobile device. In some embodiments, the received event reports triggers a redetermination of the one or more virtual lanes and a communication, to the mobile device, of the redetermination of the one or more virtual lanes. The controller may further enhance navigation and traffic management by redetermining routes based on updated road and traffic information.

In some embodiments, the traffic status information is received from one or more stationary monitors deployed along the physical road. In some embodiments, the traffic status information is determined based on information from the one or more monitors. In some embodiments, the conditions are indicative of traffic conditions on the physical road.

In some embodiments, the traffic status information includes one or more of: traffic congestion conditions and occurrence of an obstacle. The controller may further enhance navigation and traffic management by determining routes free of traffic congestion and obstacles.

In some embodiments the obtaining input and the communicating with the mobile device is performed via a wireless access network. In some embodiments, the indication of the determined one or more virtual lanes is communicated as part of a dynamically updated electronic map. In some embodiments, the wireless access network is configured to perform one or more of: repeatedly multicasting the indication of the electronic map to a plurality mobile devices including the mobile device, forwarding registration messages between the mobile device and the controller, and communicating event reports from the mobile device to the controller.

In some embodiments, the obtaining traffic status information is performed via a wireless access network via assigned wireless resources. The controller may further enhance navigation and traffic management by continuously updating the routes based on changing traffic and road conditions.

According to embodiments of the present invention, there is provided a system comprising a controller, e.g., an automatic controller, and a mobile device. The controller may be as described above. The mobile device includes a processor, a memory and a communication interface and is configured to receive the indication of the determined one or more virtual lanes and to move along one of the determined one or more virtual lanes. The mobile device may be configured to provide information to the automatic controller. The automatic controller and the mobile device may be communicatively coupled via a wireless network. The system may include other devices such as a physical road manager device, additional mobile devices, monitoring systems, a customer device, or a combination thereof.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
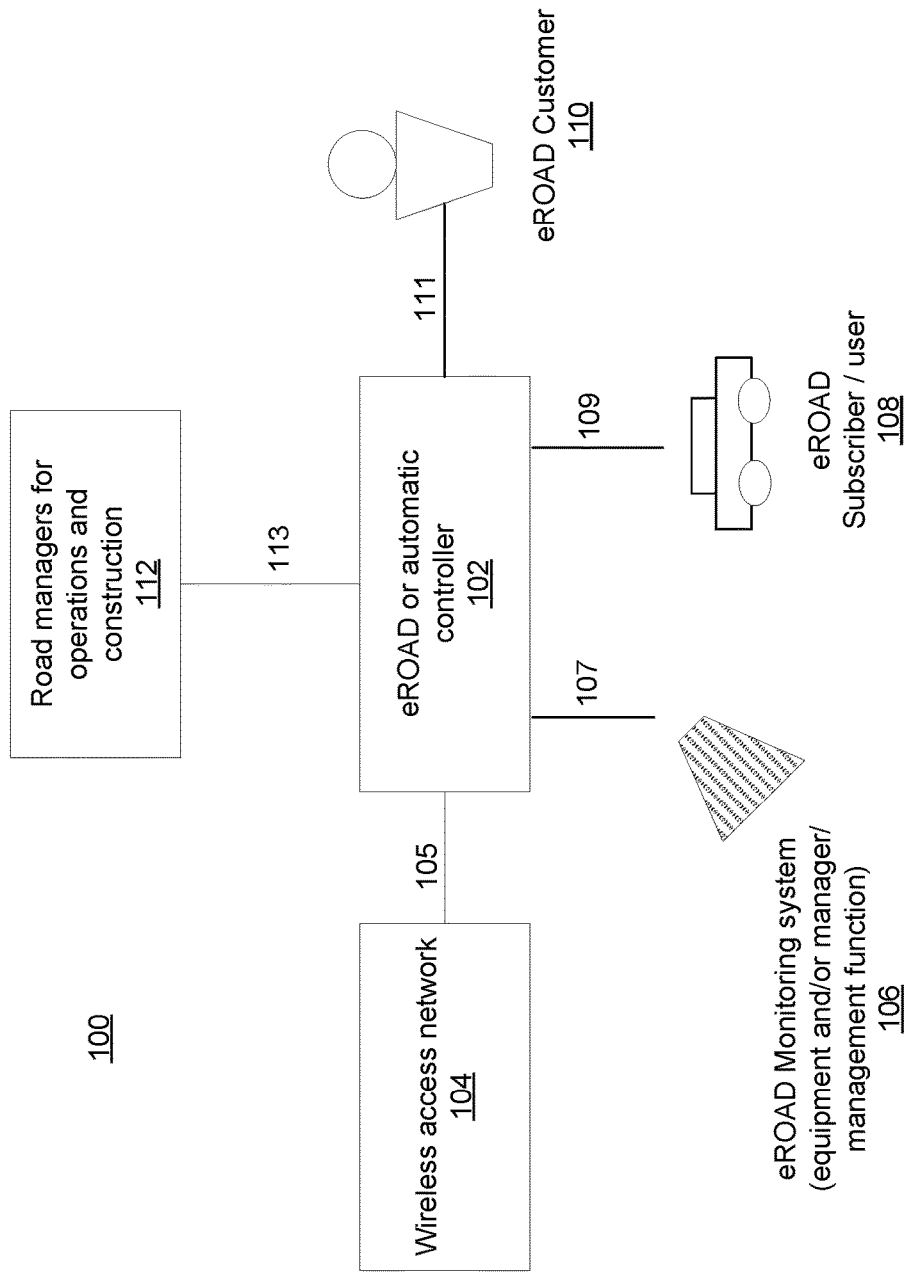
FIG. 1 illustrates an architecture of the eROAD system, according to embodiments of the present invention.

Embodiments of the present invention provide for a method and apparatus for facilitating navigation of mobile devices, such as self-driving cars on a roadway or network of roadways. Routes along a road are defined for example in the form of lanes having a given width and followed by a plurality of mobile devices in succession. The routes are overlaid onto map information indicating the location of roadways, and can be defined as a series of geographic markers following portions of such roadways. The combination of routes overlaid onto the map information results in a dynamic map which is updated in response to changing conditions. The map information can be relatively static, with only the overlay changing over time. The routes are defined by an automatic controller operating in or coupled to the network infrastructure and communicated wirelessly to mobile devices, which are then configured to follow the routes.

The routes are further dynamically defined and adjusted based on current operating conditions. These operating conditions can include traffic conditions such as traffic congestion conditions or a requirement to accommodate one or more higher-priority mobile devices such as an emergency mobile device. The operating conditions can include occurrence of an obstacle in the roadway, such as a broken down vehicle or vehicle collision, or a large pothole, debris, etc.

Although routes are described herein as being defined, it should be understood that characteristics of a route can be determined, defined or selected, rather than the route itself. The characteristic of a route may correspond to one or more lanes traversing a physical road, and the route may include at least one of the lanes. The characteristic may correspond to a line indicating the route, where the route includes a set of geographic points located along the line. The characteristics can be virtual lanes in various embodiments and throughout the present disclosure.

Embodiments of the present invention can define which path down a particular physical road should be followed by dynamically defining virtual lanes that are not necessarily dependent on pre-established painted lanes of the road, and directing mobile devices to follow such virtual lanes. Multiple virtual lanes can be defined, with one or multiple mobile devices being directed to follow each of the multiple virtual lanes.

Operating conditions can be communicated to the automatic controller from various sources. Sources can include (e.g. stationary) traffic monitoring equipment (e.g. cameras or other sensors) deployed along or within the physical roads. Such sources can indicate conditions such as mobile device speeds and traffic load on the roadway, as well as occurrence of debris, breakdowns or collisions. Other sources can include the mobile devices themselves, which may communicate data from their own sensors or cameras, or telemetry data such as desired speed or route, desired service level, current speed, alert of a breakdown, etc. Yet other sources can include traffic managers, construction managers, or mobile device customers in charge of individual or fleets of mobile devices which can provide inputs to the automatic controllers. Such input can include requests for routes or mobile device services, schedules of anticipated conditions, notifications of an emergency, etc. A network controller can be provided and configured to obtain an indication of the traffic monitoring equipment. The network controller can then assign wireless communication resources for use by the traffic monitoring equipment to communicate with the automatic controller. The network controller can be part of a wireless communication network infrastructure, for example.

Traffic managers can provide traffic management information, traffic status information or both. This may include information regarding congestion, construction, occurrence of obstacles, breakdowns or collisions, etc. Traffic management conditions can be viewed as a type of operating condition that is provided by a traffic manager.

The routes or characteristics thereof can be defined to avoid obstacles, and allow space for higher-priority routes or emergency vehicles. Different priorities of lanes can be defined for different classes of mobile devices, with less congested lanes being defined and accessed by higher-priority mobile devices. Access to higher-priority lanes can be restricted to manage congestion. Lanes of different widths can be defined so that different widths of mobile devices can be accommodated. The proportion of a roadway allocated to mobile devices travelling in a first direction, relative to the proportion of the roadway allocated to mobile devices travelling in a second direction opposite to the first direction, can be adjusted over time based on demand. As such, reversible lanes can be defined and managed. Defining of the routes or characteristics (e.g. virtual lanes) can include determining the virtual lanes by a controller. The determination can correspond to generating indications of virtual lanes which traverse along a physical road and which avoid obstacles, leave room for other virtual or non-virtual lanes, accommodate certain amounts of traffic, etc. Various methods can be used to determine virtual lanes, for example using an automated computing system which implements physical traffic engineering principles that are accepted in a relevant jurisdiction.

In various embodiments, in order to adequately follow the route communicated to a mobile device, the mobile device may be required to precisely determine its geographic location on an intermittent or ongoing basis. Various techniques, such as use of a geographic positioning system or network-assisted positioning system, can be used to facilitate such location determination. The navigation system of the mobile device determines its position relative to the route, and causes the mobile device to navigate so that its position follows the route as closely as possible.

In some embodiments, the route may be dictated to the mobile device as a single, defined route. In this case, the mobile device is configured to follow the defined route. In other embodiments, characteristics of the route to be followed are communicated to the mobile device navigation system, along with indications of multiple routes or types of routes. In this case, the mobile device navigation system is configured to select a route or type of route which exhibits the characteristics of the route, and then to follow this route or type of route selected by the mobile device navigation system.

Embodiments of the present invention provides for an eROAD concept or system to overcome the one or more limitations of prior arts.

Self-driving systems depend on sensors to obtain relevant and timely data required to navigate effectively. However, sensor may not be able to generate data or even reliable data in all circumstances, particularly when driving conditions are subject to change. For example, a sensor used by a self-driving system to detect road lines may be unable to detect the lines due to snow or ice covering the lines. The same sensor may be unable to detect road lines due to lack of light necessary for the sensor to detect the lines, for example in a tunnel. The operability or ability of such a sensor to detect road lines is important for effective navigation of a self-driving system. The effective navigation of self-driving systems is also dependent on the system's response to changing conditions, for example, effectively responding to sudden traffic congestion, whether due to an accident or merging traffics. Similarly, determining how to prioritize the use of roads in emergency situations, such as making way for ambulance and police vehicles, also becomes relevant in effective navigation of self-driving systems.

Embodiments of the present invention provide for a transportation traffic navigation service, which may be referred to as an eROAD service. The eROAD service may be provided to vehicles, such as self-driving or autonomous vehicles on physical roads, through the use of an eROAD MAP. The eROAD MAP may be a dynamic map that includes marked virtual lanes used for guiding mobile devices' navigation systems. The eROAD MAP does not necessarily indicate conventional painted physical lanes.

Rather, the eROAD MAP indicates virtual lanes which are defined in the navigation system only. This allows for a more flexible usage of the physical road. That is, lanes can be defined dynamically according to conditions and requirements. This can include lane widths and lane paths. Multiple lanes can be dynamically determined and defined in order to appropriately manage traffic in one or more directions, in response to current conditions and requirements. The eROAD service may further obtain data from camera systems or other sources which provide real-time transportation traffic load monitoring. This allows the eROAD service to be responsive to current conditions and may further improve traffic management and road usage optimization.

In various embodiments, the eROAD MAP that is defined by the automatic controller is the same eROAD MAP that is provided to the subscriber. The subscriber can use the eROAD MAP as a basis for determining which route is to be followed (e.g. as specified by the automatic controller). The automatic controller obtains input from other sources, such as monitoring equipment or mobile devices, and determines whether to update (re-determine) the eROAD MAP or routes defined thereby in response to such input. The determination can be made based on various operating routines, optimizations, etc.

A device that employs a self-driving system, such as a self-driving car, may use the eROAD service to control its movement (speed and direction). To use the eROAD service, the device, having access to the eROAD MAP, may compare its current location to the location of a particular virtual lane. The virtual lane may be the nearest or most appropriate virtual lane location corresponding to the device's desired path or destination, or an otherwise assigned virtual lane. The device may obtain its current geographic location using various techniques, such as a geographic positioning system or network-assisted positioning system. Upon determining the virtual lane to be traversed, the device can begin navigating accordingly. This can involve navigating the device (e.g. by steering a vehicle) so that the distance between the device and the virtual lane is minimized (e.g. substantially zero) and so that the travel direction of the device aligns to the travel direction of the virtual lane.

Embodiments will now discuss the architecture and functions of the eROAD system.

FIG. 1 illustrates an overall architecture of the eROAD system, according to embodiments of the present invention. Referring to FIG. 1, the eROAD system 100 includes an eROAD controller 102 and registered eROAD subscribers 108. The eROAD controller 102, which may also be referred to as an automatic controller, operates in or is coupled to a network infrastructure and communicates wirelessly with other network entities, including devices such as self-driving cars. As such, one or more of the illustrated interactions 107, 109, 111, 113 can be performed via the wireless access network 104. The eROAD controller 102 is responsible for obtaining or receiving a variety of information indicative of current operating conditions for physical roads. The automatic controller 102 may further be configured to determine or create an eROAD MAP on demand in response to a request for an eROAD service from an eROAD subscriber 108. The automatic controller 102 may determine or create one or more eROAD MAP based on at least the current operation conditions, pre-existing data or both. The automatic controller 102 may further be configured to communicate the created eROAD MAP to devices such as eROAD subscribers 108. The automatic controller 102 may communicate one or more determined or created eROAD MAP to eROAD subscribers 108 through broadcast, multicast or unicast messages.

In operation, the automatic controller 102 interfaces with other system entities, including eROAD service customers 110; eROAD service subscribers 108; road managers 112; monitoring system 106 including transportation traffic monitoring equipment, monitoring system manager, or monitoring system management function; and wireless access network 104.

According to embodiments of the present invention, the automatic controller 102 may interface 111 with one or more service customers 110, which may include an owner of or an entity responsible for one or more mobile devices that may use the eROAD service. The service customers 110 may request, from the automatic controller 102, an eROAD service. The request may include a requested service level. The service customer 110 may send information in the request to the automatic controller 102. The information may include one or more of: the number of mobile devices; information identifying the mobile devices, such as model and year; planned paths and schedule and a preferred service quality requirement. The automatic controller 102 may determine a service level according to obtained information from the service customer 102 and other information indicative of operating conditions. The automatic controller 102 may create an eROAD MAP, including routes (virtual lanes), according to the determined service level, obtained information, and other information indicative of operating conditions. The automatic controller 102 may respond to the service customer 110 with the determined service level included in instructions or policy. These instructions or policy are then implemented by the service customer 110. The automatic controller 102 may include in the response the created eROAD MAP. The service customer 110 may configure its mobile devices according to the instructions or policy obtained from the automatic controller 102.

In some embodiments, the service customer communicates with the controller without a wireless connection or support from the access network. For example, the customer may send a list of possible subscribers to the controller, and there may be a subscriber that is not in the list. This subscriber still can register, subscribe or both register and subscribe to the controller for the service. In one embodiment, the controller may reject a device's registration even though it was in the list sent by the service customer. That is, a registration from the device may be required while the information from the customer is not necessarily required. In another example, the customer may have access to register a subscriber to the controller. That is, the registration may be done via an interface which is separate from the interface for the communication of the eROAD MAP and the routes to a mobile device navigation system.

According to embodiments of the present invention, the automatic controller 102 may interface 109 with an eROAD service subscriber 108, which may represent one or more mobile devices. A service subscriber 108 may register or subscribe to obtain an eROAD service by sending a request to the automatic controller 108. In the request, the service subscriber 108 may include, for example, one or more of: an identifier of the device or vehicle such as the model of the device or vehicle; a requested quality of service or level of service or both a quality and a level of service; planned path and schedules, and other relevant information. Upon receiving the request, the automatic controller 102 may determine a level or quality of service based on the information obtained in the request. The automatic controller 102 may then assign or associate the level or quality of service to the subscriber's device. Routes can also be associated with a quality of service level, so that a mobile device is required to have a quality of service level at least as great as the quality of service level of the route in order to use that route. The automatic controller 102 may generate an eROAD MAP and a corresponding use policy (also referred to as a service level policy), according to the determined level of service, information obtained in the request, and other information obtained. The map may be adjusted dynamically based on operating conditions, with updates accordingly sent to the service subscriber. The use policy may indicate which routes and virtual lanes the subscriber 108 is permitted to use, a valid time window for permitted uses, and other use criteria such as speed and vehicle occupancy requirements. The use policy may be periodically updated according to changing road conditions, permitting the subscriber's mobile device to respond effectively to the changing conditions. In some embodiments, the transmission including the eROAD MAP may be encrypted, and the automatic controller 102 may also provide the service subscriber 108 with a key for decrypting the eROAD MAP. The use policy can be communicated as a characteristic of the route.

Upon decrypting the eROAD MAP (if necessary), the service subscriber 108 may implement the use policy and begin using the eROAD MAP. As the automatic controller 102 periodically obtains information indicative of road conditions, the automatic controller 102 may update the use policy provided to the service subscriber 108, and accordingly the service subscriber 108 may implement the updated use policy.

Similarly, the service subscriber 108 may periodically obtain information related to changing road conditions while on its course. The service subscriber 108 may report events to the automatic controller 102 related to the changing road conditions.

According to embodiments of the present invention, the automatic controller 102 may interface 113 with managers for road operations or road constructions 112 in providing eROAD service including the development and periodic updating of eROAD MAPs. The road managers 112 may send, to the automatic controller 102, information indicative of current road conditions. The information sent by the road manager 112 may include an indication of physical layout, scheduled road maintenance or construction events, road quality, weather-dependent road conditions and corresponding speed limits and permitted uses. The information may include events reported to the road manager 112 by other road entities. The automatic controller 102 may use the obtained information to adjust the eROAD MAPs provided to subscribers 108. The automatic controller 102 may also send, to the road managers 112, indications of events reported by subscribers 108, such as accidents, pot holes and other road conditions, which may be used to inform the road managers 112 of required maintenance, construction or both. The automatic controller 102 may further send the road managers 112 information related to proposed schedules for road maintenance, constructions or both based on traffic conditions.

According to embodiments of the present invention, the automatic controller 102 may interface 107 with a monitoring system 106 including (e.g. stationary) traffic transportation monitoring equipment or a monitoring systems manager (management function). The automatic controller 102 may obtain one or more reports including monitoring results. The reports may be obtained upon a request. The reports may be obtained from the monitoring system 106 monitoring equipment or monitoring system management function. In some embodiments, the monitoring system 106 may periodically send one or more reports including the monitoring results. The monitoring results sent by the monitoring system 106 may be related to one or more of the following changing traffic conditions: existing and predicted congestion zones, existing and predicted congestion periods, lane usage and available lanes for alleviating traffic congestion, periodic traffic load status results, the triggering of one or more pre-defined condition, threshold, or both and other relevant changing traffic conditions. The automatic controller 102 may interact with the monitoring equipment, such as registered road side cameras, and periodically obtain monitored data.

According to embodiments of the present invention, different components of the eROAD system 100 may communicate via an interface 105 with a wireless access network 104. The wireless access network 104 may provide to the eROAD system 100 network resources to enable the automatic controller 102 to communicate with the service subscriber 108 and the monitoring equipment. The wireless access network 104 may dedicate a network slice to provide a communication service the eROAD system 100.

Figure 2:
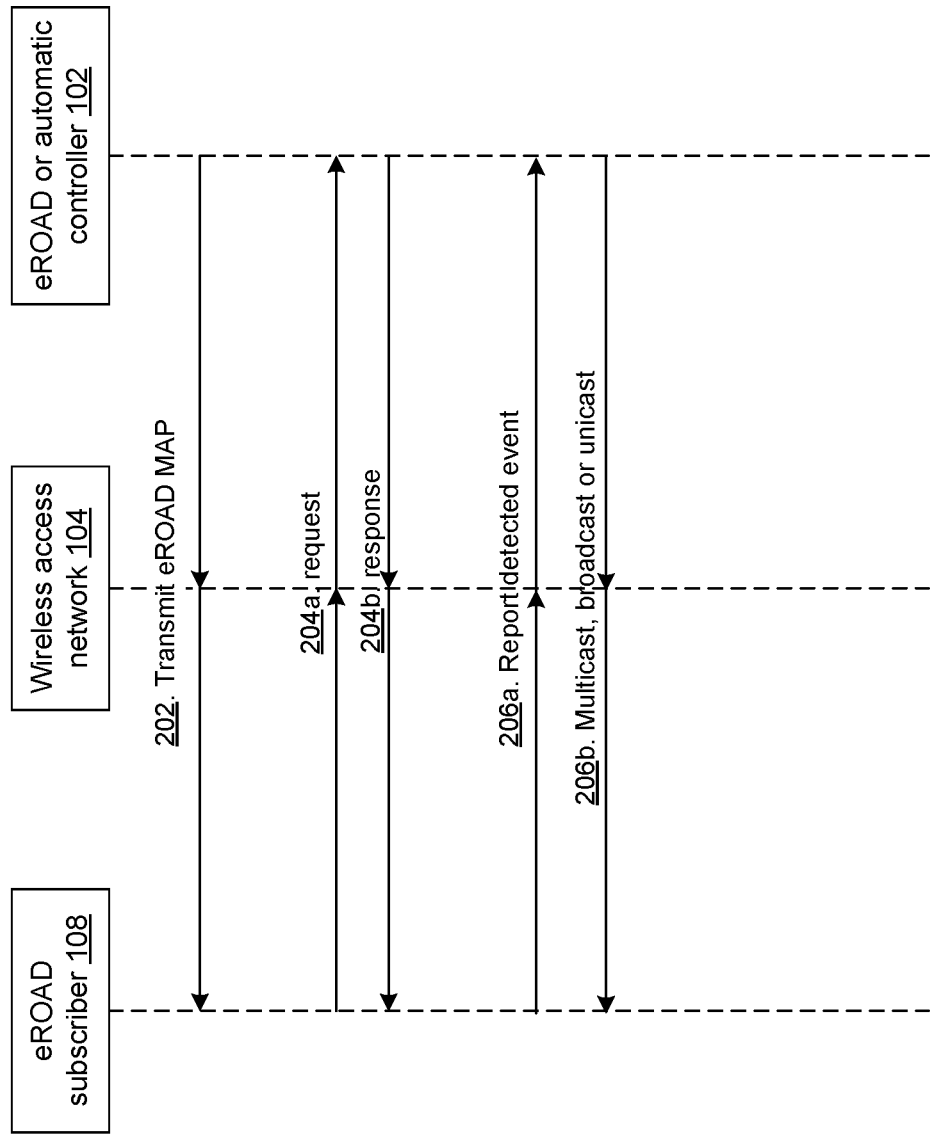
FIG. 2 illustrates a procedure for provisioning eROAD MAP, registering service subscriber and reporting events via a wireless access network, according to embodiments of the present invention.

FIG. 2 illustrates a procedure for provisioning an eROAD MAP, registering service subscriber and reporting events via the wireless access network, according to embodiments of the present invention. Referring to FIG. 2, at step 202, the automatic controller 102 may periodically or on-demand provide an encrypted eROAD MAP to service subscriber 108 through the wireless access network 104. The automatic controller 102 may also include with the encrypted eROAD MAP a use policy and encryption key as discussed elsewhere herein. The wireless access network 104 may obtain encrypted eROAD MAP from the eROAD controller 102 and may periodically or on-demand broadcast, multicast or unicast the obtained map to service subscribers 108. The obtained encrypted eROAD MAP may be provided in response to a request from a service subscriber 108 for an eROAD service. The request may include information as discussed above and elsewhere herein.

Referring to FIG. 2, at step 204a, a new service subscriber 108 may register for an eROAD service by requesting from the automatic controller 102 for an eROAD service, including in the request information identifying the subscriber's mobile device, planned path and schedule of the mobile device and other information as discussed elsewhere herein. The service subscriber 108 may send the request to the automatic controller 102 through the wireless access network 104, which relays the request to the automatic controller 102. The automatic controller 102, having obtained the service subscriber's registration information may, at step 204b, respond accordingly, through the wireless access network 104. The response may be a positive response registering the service subscriber or a negative response refusing registration. A positive response may include one or more of an encrypted eROAD MAP generated based on the subscriber's registration information, a use policy for the eROAD map and encryption key as discussed with reference to step 202 and elsewhere herein.

Referring to FIG. 2, at step 206a, the service subscriber 108 may report events, as discussed elsewhere herein, to the automatic controller 102, through the wireless access network 104. The service subscriber 108 may report an event to the automatic controller 102 upon a triggering of a pre-defined threshold. The automatic controller 102 may, at step 206b, accordingly multicast, broadcast, or unicast the reported event to one more of other service subscriber 108.

The wireless network 104 relays the messages between the service subscriber 108 and the automatic controller 102. As used herein, when a wireless network is specified as performing an action, or a communication is specified as occurring via the wireless network, it should be understood that the action can be performed via a node of the wireless network, or that the communication can occur via the node of the wireless network. The node may be an access network (AN) node with wireless communication capabilities.

The wireless network can be used to facilitate various communication operations with the controller, for example communication with mobile devices, subscribers, monitoring equipment, road managers, or a combination thereof. In some embodiments, some or all of the communication operations can be performed via particular assigned resources. For example, wireless resources can be dedicated to certain communication operations, such as reports from monitoring equipment, communication of virtual lanes to mobile devices, or the like, or a combination thereof.

Figure 3:
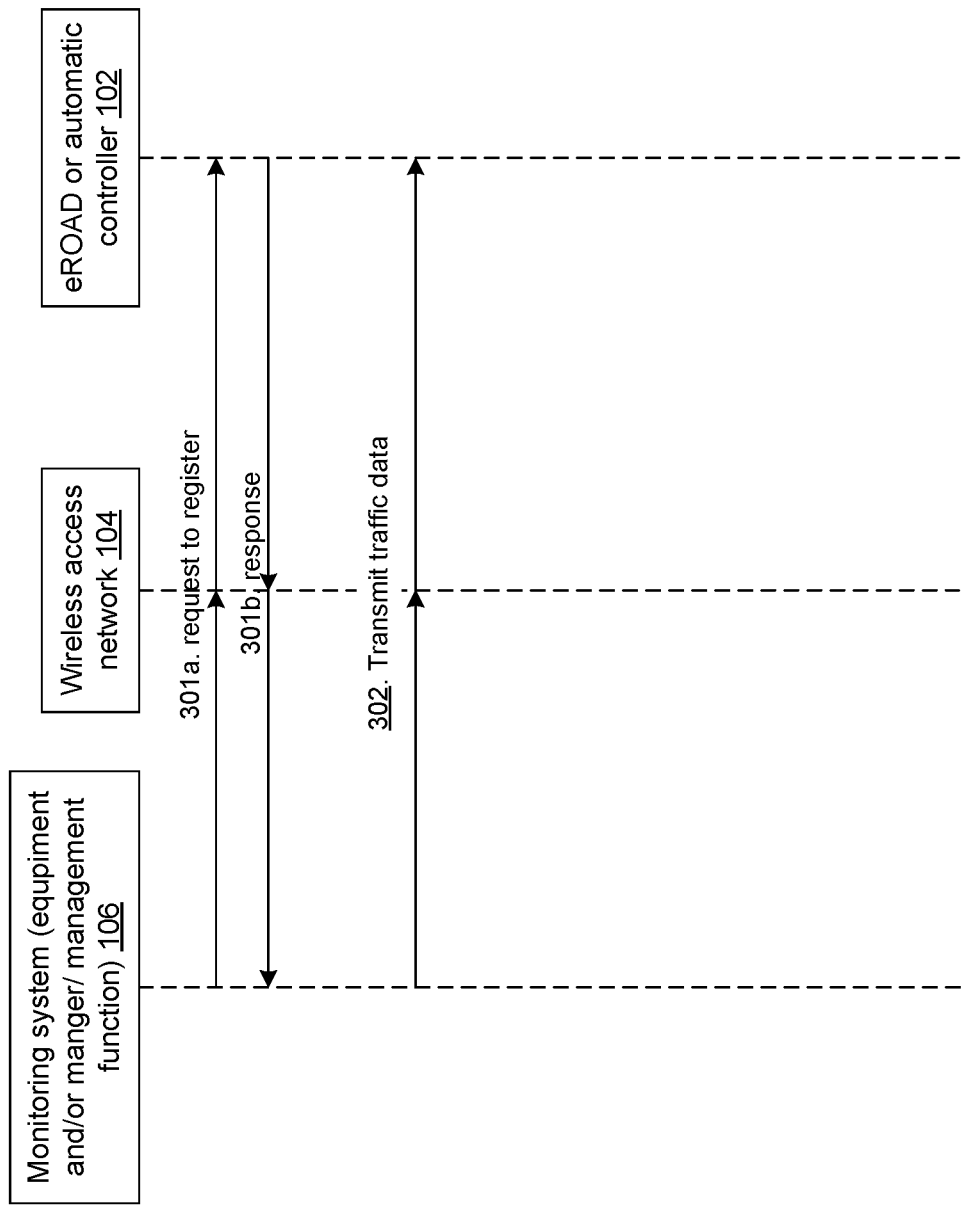
FIG. 3 illustrates a procedure for communication between an automatic controller and a monitoring system (equipment) via a wireless access network, according to embodiments of the present invention.

FIG. 3 illustrates a procedure for communication between the automatic controller and the monitoring system (equipment) via a wireless access network, according to embodiments of the present invention. Referring to FIG. 3, at step 301*a*, the monitoring system 106 may register with the automatic controller 102 by sending a request to register. At step 301*b*, the automatic controller 102 may send a response to the monitoring system 106, the response indicating that the monitoring system 106 was registered or not registered.

At step 302, the monitoring system 106 may collect information indicative of transportation traffic load, road conditions, or both. This information may include camera images or data, for example. The monitoring equipment may be pre-configured with or periodically provisioned with network resources to communicate with the automatic controller 102. The monitoring equipment 106 may report or send the collected information to the automatic controller 102.

Figure 4:
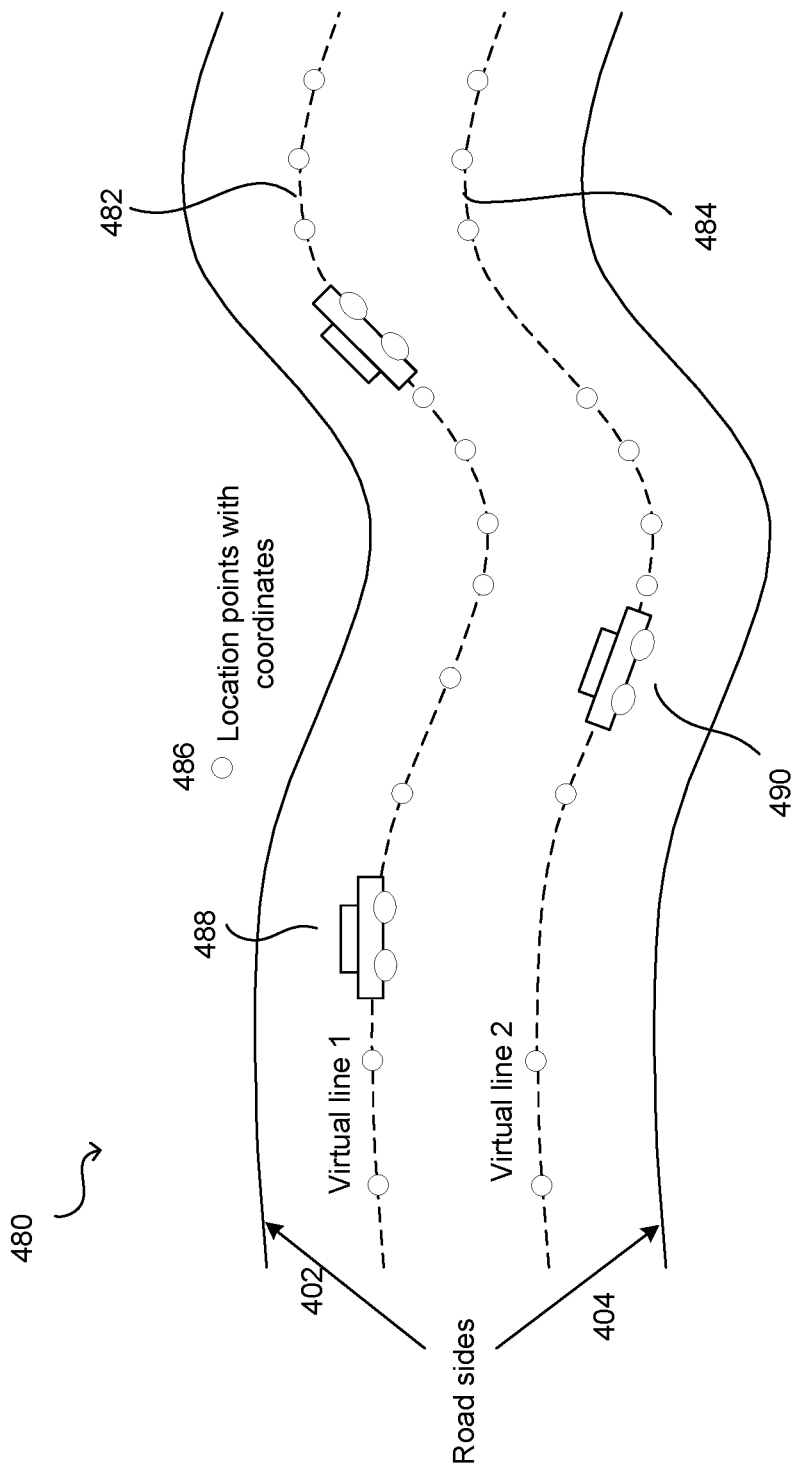
FIG. 4 illustrates an example eROAD MAP including an eROAD with two virtual lanes, according to embodiments of the present invention.

FIG. 4 illustrates an example eROAD MAP including an eROAD with two virtual lanes, according to embodiments of the present invention. Referring to FIG. 4, the eROAD 480 may use a physical road defined by road side boundaries 402 and 404. The eROAD 480 may include virtual lanes 482 and 484, which may be represented by virtual lines, line 1 and line 2, corresponding to lanes 482 and 484 respectively. The virtual lines 1 and 2 may be defined or described by a series of location points 486 (denoted as circles) with coordinates along the physical road. Each virtual line may have a corresponding use policy which includes a service quality level identifier (ID). Service quality may be defined in various ways. For example, service quality may be defined according the level of emergency, such as a high level, middle or medium level, normal level, low level and etc. Service level may also be defined according to a speed level requirement, for example, level 1 speed may correspond to a speed greater than 300 km per hour, level 2 speed may correspond to a range of speed between 250 km per hour and 300 km per hour, etc. The service quality level can be defined according to a width range allowed for mobile devices traversing the route. For example, the lane can have a predetermined width and allow for up to a certain width of vehicle. An eROAD MAP is a dynamic map that may be changed according to one or more of the physical road layout, changing traffic and road conditions, or subscriber quality of service requirement, as further discussed elsewhere herein. Mobile devices subscribed to the eROAD service may be assigned an eROAD MAP including a route corresponding to the mobile device's requirements, as discussed elsewhere herein. For example, vehicle 488 may be assigned an eROAD MAP indicating the vehicle's route as virtual line 1, corresponding to a first virtual lane 482. The vehicle 488's route is defined by physical location markers, which may be the location points with coordinates 486. Having obtained its route, the navigation system of vehicle 488 may be configured to monitor the physical location of the vehicle 488 and guide the vehicle 488 along the series of the location markers, which are defined by the eROAD MAP. Similarly, the vehicle 490 may be assigned an eROAD MAP indicating the vehicle's route as virtual line 2, corresponding to a second virtual lane 484. The navigation system of vehicle 490 may be configured to monitor the vehicle's physical location and guide the vehicle along its route.

In some embodiments, each lane or each line of the eROAD MAP belongs to or is associated with one or more classification. Each classification corresponds to one or more characteristics of the route. In some embodiments, the classification includes one or more characteristics such as of: a speed limit, a quality level, a route sharing allowance, a width size, a lane ID, or a line ID. A mobile device may select a route from multiple presented alternatives by matching the received characteristic to at least one specific classification and selecting the one or more lane or the line from a set of lanes or lines that belongs to the specific classification. Different lanes or lines can have certain classifications, and in order to use a lane or line, a mobile device should have direction to use route characteristics corresponding to these classifications. The route characteristics may be communicated to the mobile device by the automatic controller.

In various embodiments, the eROAD MAP is provided which defines multiple possible routes (e.g. lanes or lines). Each route can be associated with particular characteristics, such as widths, service quality, speed ranges, etc. The mobile device in receipt of the eROAD MAP can then select, based on this information, one of the routes to follow. The route should be such that the mobile device meets any requirements associated with the characteristics. For example, the mobile device should have adequately narrow width, be adequately authorized to receive the service quality, be travelling in the specified speed range.

In some embodiments, the eROAD MAP includes additional information to emulate a vertical traffic light at a physical intersection. The physical intersection may be represented by a location mark on the eROAD MAP. The location mark may be associated with a stop time window, for example, of 0 to 30 seconds. During the stop time window a mobile device at the location mark is required to be at zero speed, i.e. stopped as if at a red traffic light. Accordingly, once a mobile device arrives at a physical intersection represented by a location mark on the eROAD MAP, the mobile device's navigation system may check the current time and control its speed so that the mobile device does not cross the location mark during the stop time window. This may require that the mobile device slows or stops before or at the location mark. For example, a mobile device arriving at 2:31:13 pm at a location mark with a stop time window beginning at 2:31:00 pm and lasting until 2:31:30 pm may stop at the location mark until 2:31:30 pm before beginning to move again (e.g. before turning left at the intersection).

In some embodiments, the automatic controller may configure a virtual traffic control signal for controlling traffic at an intersection involving at least one of the virtual lanes. The automatic controller may further communicate an indication of the virtual traffic control signal to the vehicle(s), user(s), or mobile devices 108. The virtual traffic control signal may be communicated and associated with the location mark representing the physical intersection, as discussed above. The virtual traffic control signal may emulate a vertical traffic light at the intersection, as discussed above.

In some embodiments, the eROAD MAP includes additional information for controlling lane changes. This may allow mobile devices to switch between multiple virtual lanes defined on the eROAD MAP. The lanes may be marked by or updated with one or more location marks. Each of these location marks associated with a (e.g. one bit) "lane change" flag. The flag may be set to indicate that a lane change is permitted at the location mark. Otherwise, if the flag is not set, then lane change is not permitted at the location mark. A mobile device arriving at a location mark with a "lane change" flag which is set, may, at its option, change lanes.

In various embodiments, a virtual line, which may define or be part of a virtual lane, may include a list of location coordinates to be followed. A vehicle following a virtual line may navigate between successive coordinates in the list, for example by travelling in a substantially straight line from one coordinate to the next. Virtual lines are not necessarily straight lines but rather refer to paths of arbitrary shape. Selected ones of the coordinates may be marked with an indication that a mobile device is permitted to change between virtual lanes at such coordinates. This allows mobile devices to perform semi-autonomous navigation by selecting a desired virtual lane, while controlling the manner at which lane changes are permitted. This allows for traffic control.

FIGS. 5A, 5B, 5C, and 5D illustrate example eROADs, according to embodiments of the present invention. An eROAD may be defined as a physical road with one or more virtual lanes included as part of an eROAD MAP. The virtual lanes may be dynamically adjusted during use to provide for varying lane widths or to avoid obstacles, for example.

One or more of the virtual lanes may have a specified width for accommodating a predetermined size of mobile device. One or more of the virtual lanes may be associated with one or more of specific quality or level of service, such as an emergency level or a required speed level. Accordingly, the one or more lanes may be prioritized according to the traffic and road conditions. Similarly, the width, length and the travelling direction of the one or more virtual lanes may be adjusted according to the changing traffic conditions. As such, an eROAD, including one or more virtual lanes, may represent at least a portion of the physical road. Limiting the use of the physical road to certain portions of the physical road is particularly useful during road maintenance and construction. Determining, through eROADs or virtual lanes, what portion of the physical road may be used obviates the time and resources needed to block using traffic cones, barricades and other human and physical resources. The eROAD MAP may be automatically generated based on scheduled maintenance, road constructions or both provided by the road managers 112 to the automatic controller 102, as discussed elsewhere herein.

Figure 5A:
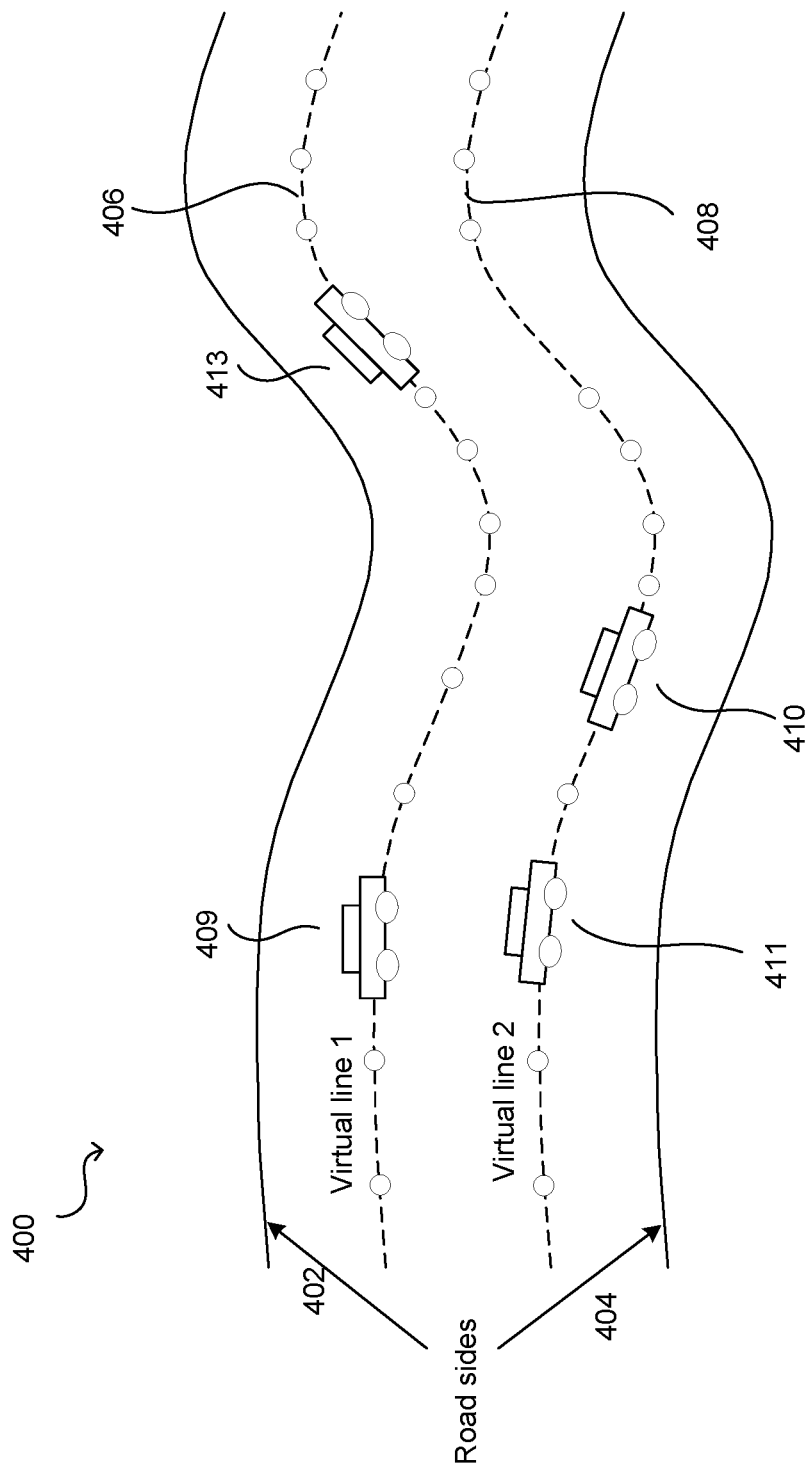
FIG. 5A illustrates an example eROAD including lanes of same quality of service and width, according to embodiments of the present invention.

FIG. 5A illustrates an example eROAD including lanes of same quality of service and width, according to embodiments of the present invention. Referring to FIG. 5A, the eROAD 400, having physical road side boundaries 402 and 403, may include virtual lanes 406 and 408. The lines determine the route to be taken by a mobile device. The lanes 406 and 408 are of the same width, indicating that mobile devices 409, 410 and 411 may be of up to an allowable width or a certain width, as determined by the lane width, may use the lanes. The direction of the lanes 406 and 408 may be the same or opposites, and may change according to changing traffic and road conditions.

Depending on the traffic and road conditions, the lanes 406 and 408 may need to be changed to accommodate larger size mobile devices that is not permitted to use the lanes. Accordingly, the eROAD 400 may need to be adjusted to respond more effectively to the changing traffic and road conditions.

Figure 5B:
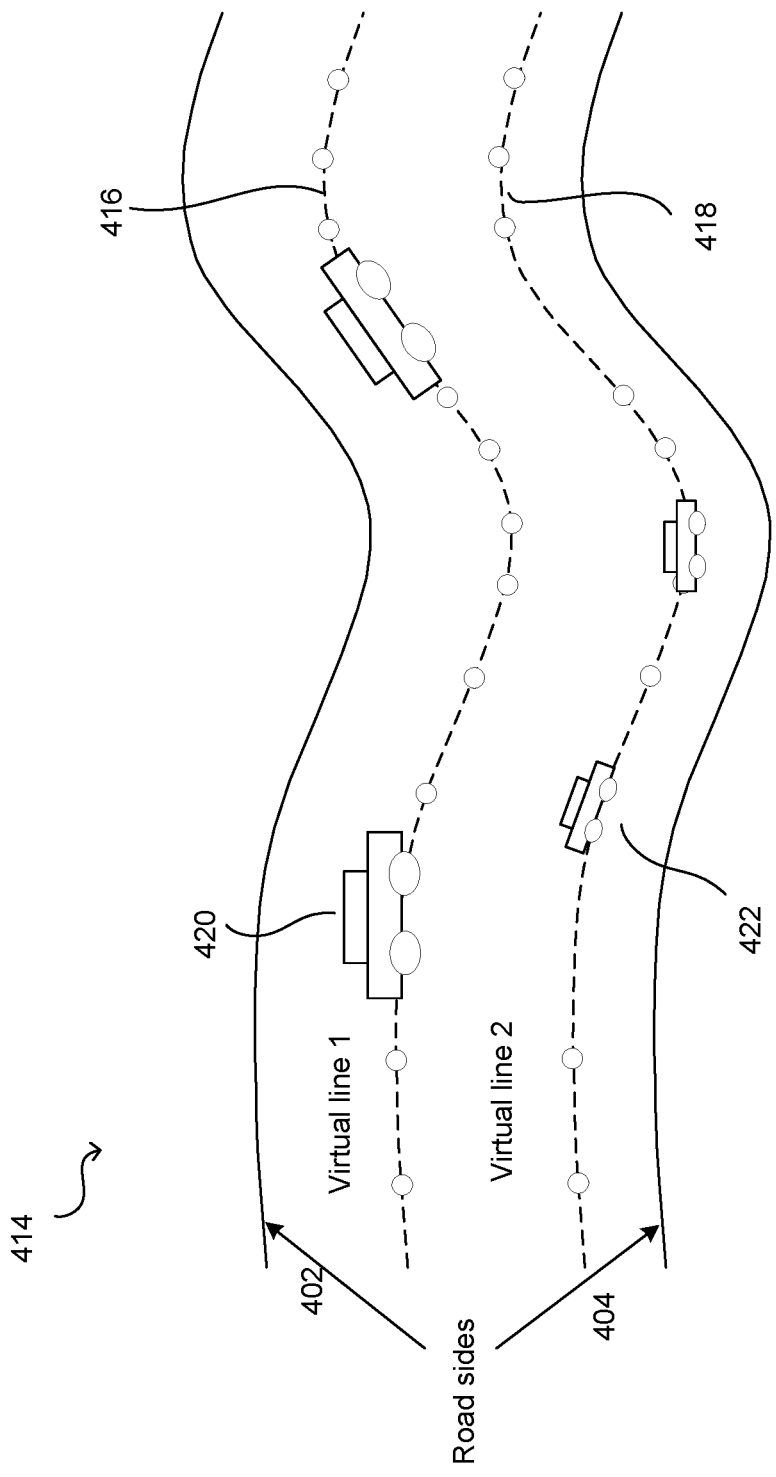
FIG. 5B illustrates an example eROAD including lanes of different width, according to embodiments of the present invention.

FIG. 5B illustrates an example eROAD including lanes of different widths, according to embodiments of the present invention. Referring to FIG. 5B, the eROAD 414 may include virtual lanes 416 and 418 that are of different width. Lane 416 may be of larger width compared to lane 418, thereby limiting the use of lane 416 to mobile devices of larger sizes 420. Similarly, lane 418, having a smaller width compared to lane 416, limits the use of lane 418 to mobile devices of smaller sizes 422. In some embodiments a virtual lane may be defined using single lines indicating the center of the virtual lane, optionally along with a width parameter indicating the width of the virtual lane. In other embodiments, a virtual lane may be defined using a pair of lines which indicate the left and right boundaries of the virtual lane.

Figure 5C:
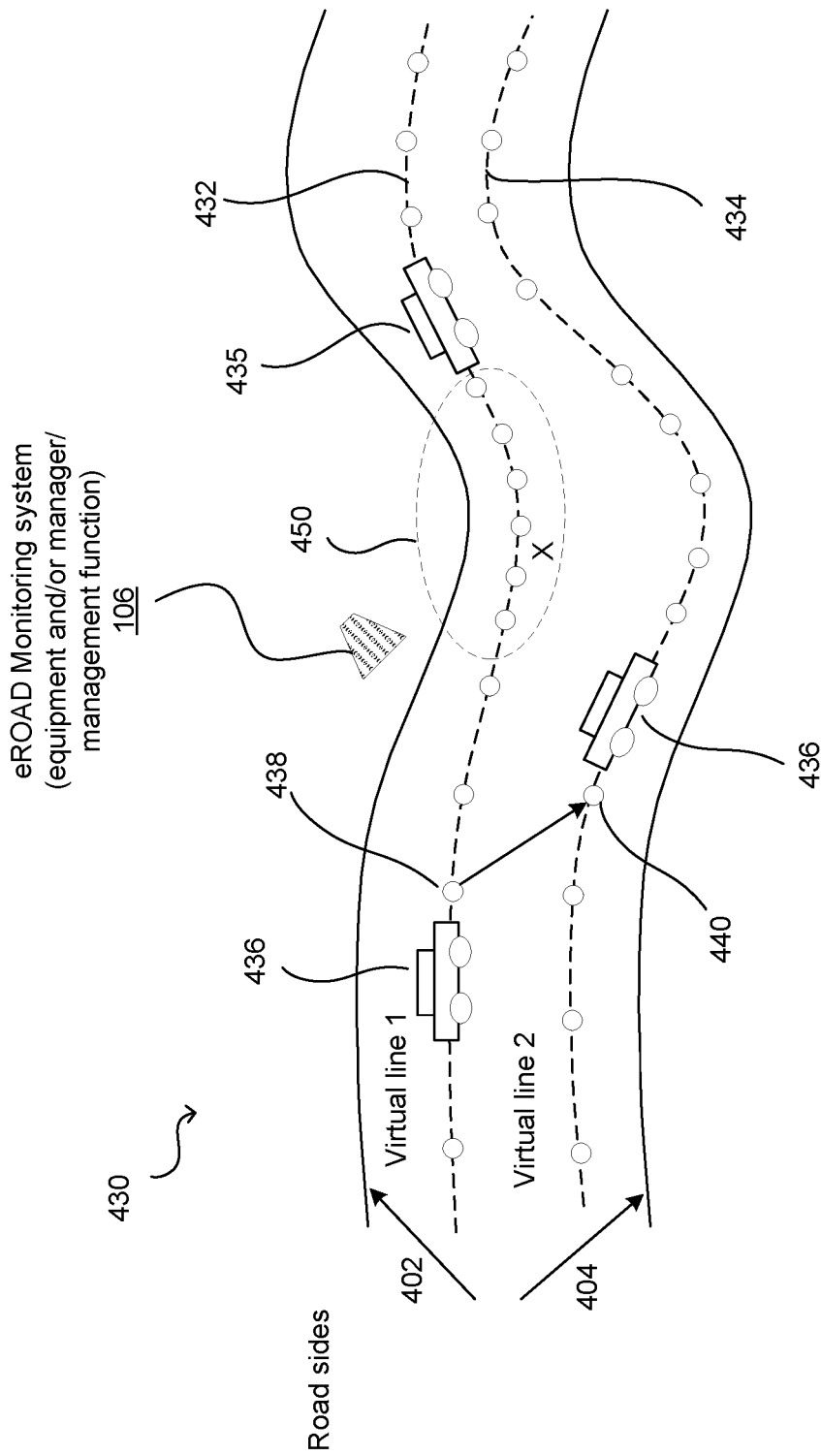
FIG. 5C illustrates an example eROAD for releasing a traffic congestion, according to embodiments of the present invention.

FIG. 5C illustrates an example eROAD for releasing a traffic congestion, according to embodiments of the present invention. Referring to FIG. 5C, the eROAD 430 may include virtual lanes 432 and 434. Mobile device 435, a subscribed user having been assigned lane 432 as its route according to its eROAD MAP, has just experienced traffic along its route. The mobile device 435 may collect transportation data related to the traffic experienced, as discussed in step 302 of FIG. 3. The mobile device 435 may then report the traffic event to the monitoring system 106, the automatic controller 102 or both. The mobile device 435, may report the event according to step 206 of FIG. 2. The traffic event may include the location points with coordinates that determine a congestion zone 450. In the case that the mobile device 435 only reports the traffic event to the monitoring system 106, the monitoring system 106, relays the event to the automatic controller 102 and other system entities, including other mobile devices subscribers 108. In some embodiments, the monitoring system 106 may collect data according to step 302 of FIG. 3 and communicate the collected data, which may for example indicate the congestion zone 450, to the automatic controller 102.

The automatic controller 102 may then respond to the changing traffic condition, being the congestion zone, and update the user subscribers' eROAD MAP having the same route as mobile device 435, the route being lane 432. The automatic controller 102 may perform step 202 of FIG. 2 in updated the eROAD MAP and provisioning it to the mobile device 436. Accordingly, mobile device 436, which may have the same route as mobile device 435, will obtain an updated eROAD MAP instructing or proposing a change in mobile device 436's route from lane 432 to lane 434. The instruction may include the appropriate location point coordinates 438 at which the mobile device 436 should (or is permitted to) change its route from lane 432 to the appropriate location point coordinate 440 on lane 434, thereby preventing the mobile device 436 from experiencing the congestion zone 450 and further reducing the congestion zone 450. The mobile device 436's navigation system that obtains the updated route may generate an outcome that will cause the mobile device to change the route according to changed route. For example, the navigation system may notify the driver through the mobile device's display that a congestion zone is expected and at what point along the route should the driver change its route.

Figure 5D:
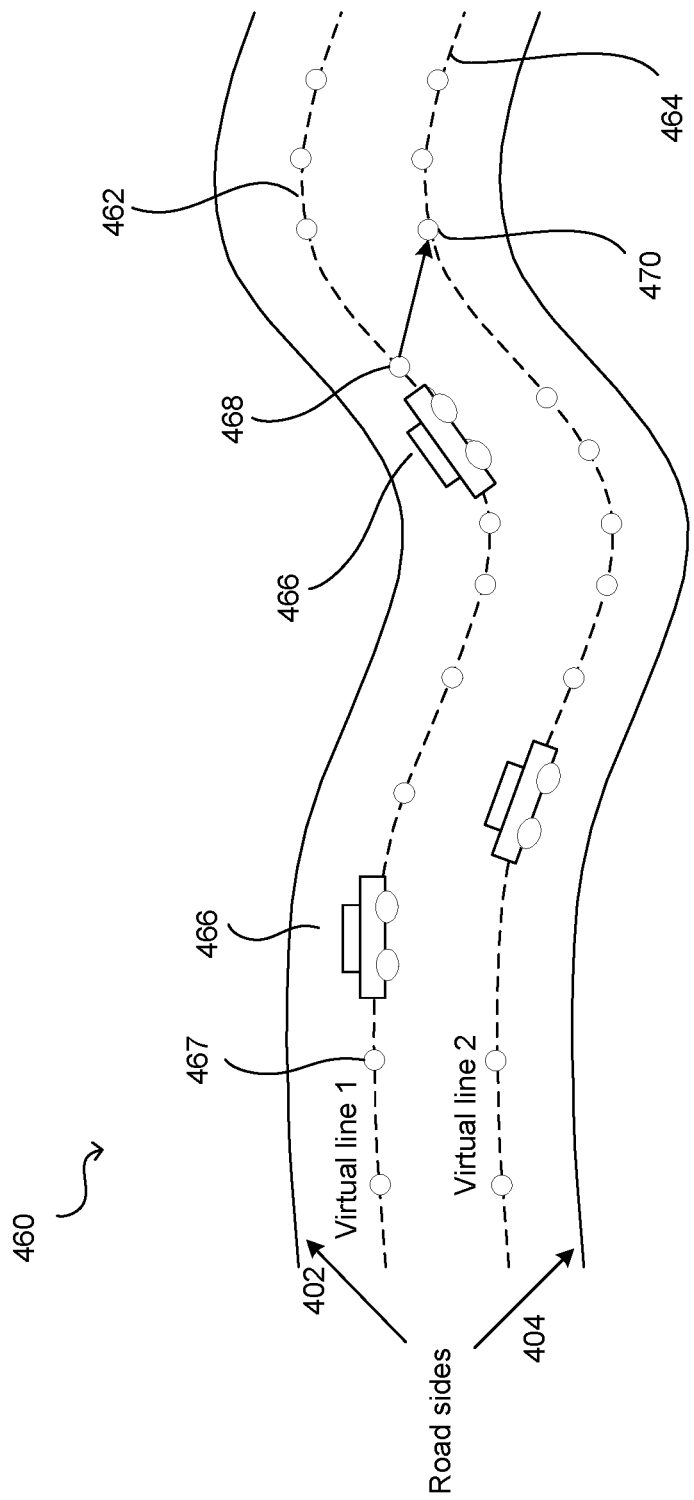
FIG. 5D illustrates an example eROAD for an emergency lane, according to embodiments of the present invention.

FIG. 5D illustrates an example eROAD for an emergency lane, according to embodiments of the present invention. Referring to FIG. 5D, the eROAD 460 may include lanes 462 and 464. Mobile device 466 may correspond to a subscribed user of the eROAD service having been assigned an emergency level of service. The automatic controller 102 has an indication of the mobile device 466 route, i.e. lane 462. The automatic controller may accordingly determine that a change in route from lane 462 to 464 may be more efficient for the level of service of mobile device 466. The automatic controller 102 may have knowledge of mobile device 466's higher priority service level by receiving input from mobile device 466, the input indicating the service priority level at an earlier period, for example at location point coordinate 467. Accordingly, the automatic controller may determine the appropriate location point coordinates 468 at which the mobile device 466 should change its route from lane 462 to the appropriate location point coordinate 470 on lane 464, thereby making the route more efficient. The automatic controller 102 may then update the mobile device 464's eROAD MAP, including the new route, and notify the mobile device 466. Accordingly, the mobile device 466's navigation system that obtains the updated route may generate an outcome that will cause the mobile device to change the route according to changed route. For example, the navigation system may notify the driver through the mobile device's display that a faster route is available and at what point along the route should the driver change its route.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Figure 6:
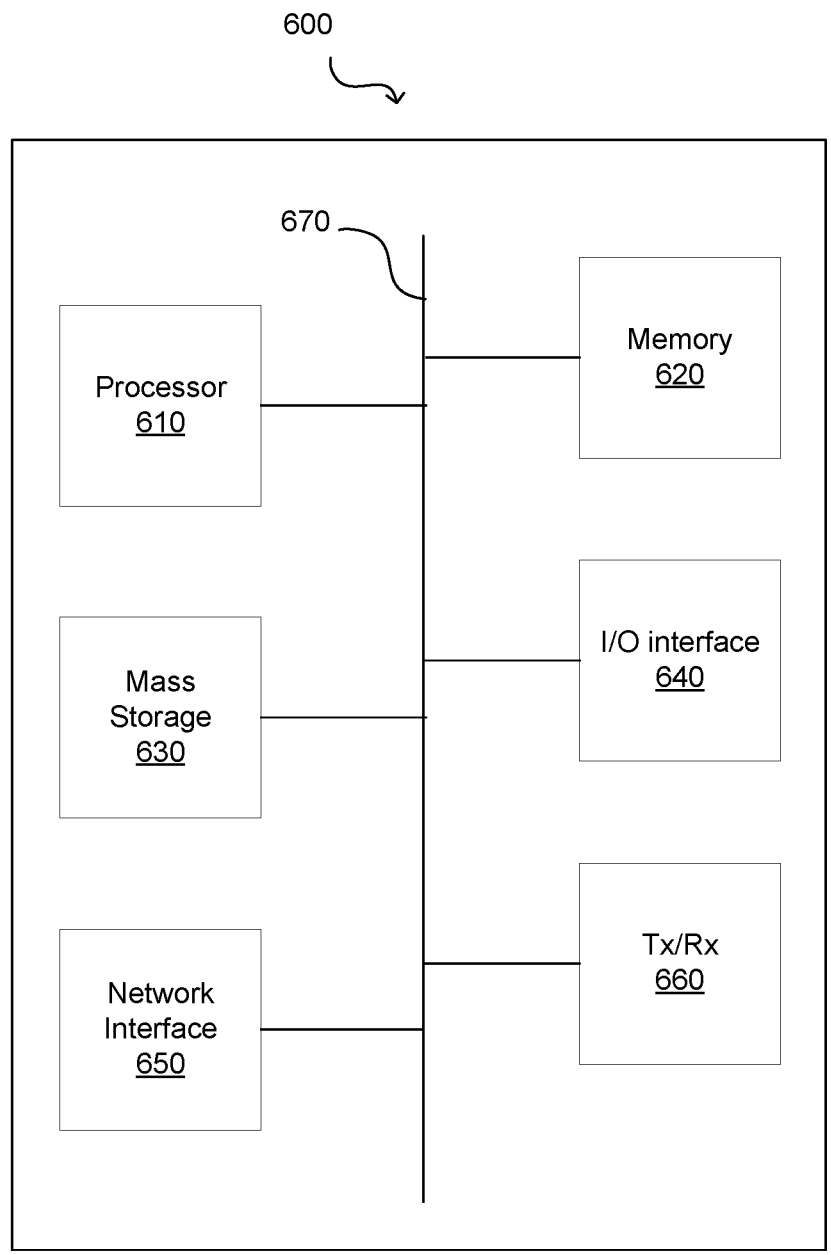
FIG. 6 is a schematic diagram of an electronic device that may perform any or all of operations of the methods and features explicitly or implicitly described herein, according to different embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600. The electronic device 600 may be used to implement the apparatus 500 of FIG. 5, for example.

As shown, the device includes a processor 610, such as a Central Processing Unit (CPU) or specialized processors such as a Graphics Processing Unit (GPU) or other such processor unit, memory 620, non-transitory mass storage 630, Input and Output interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

Figure 7A:
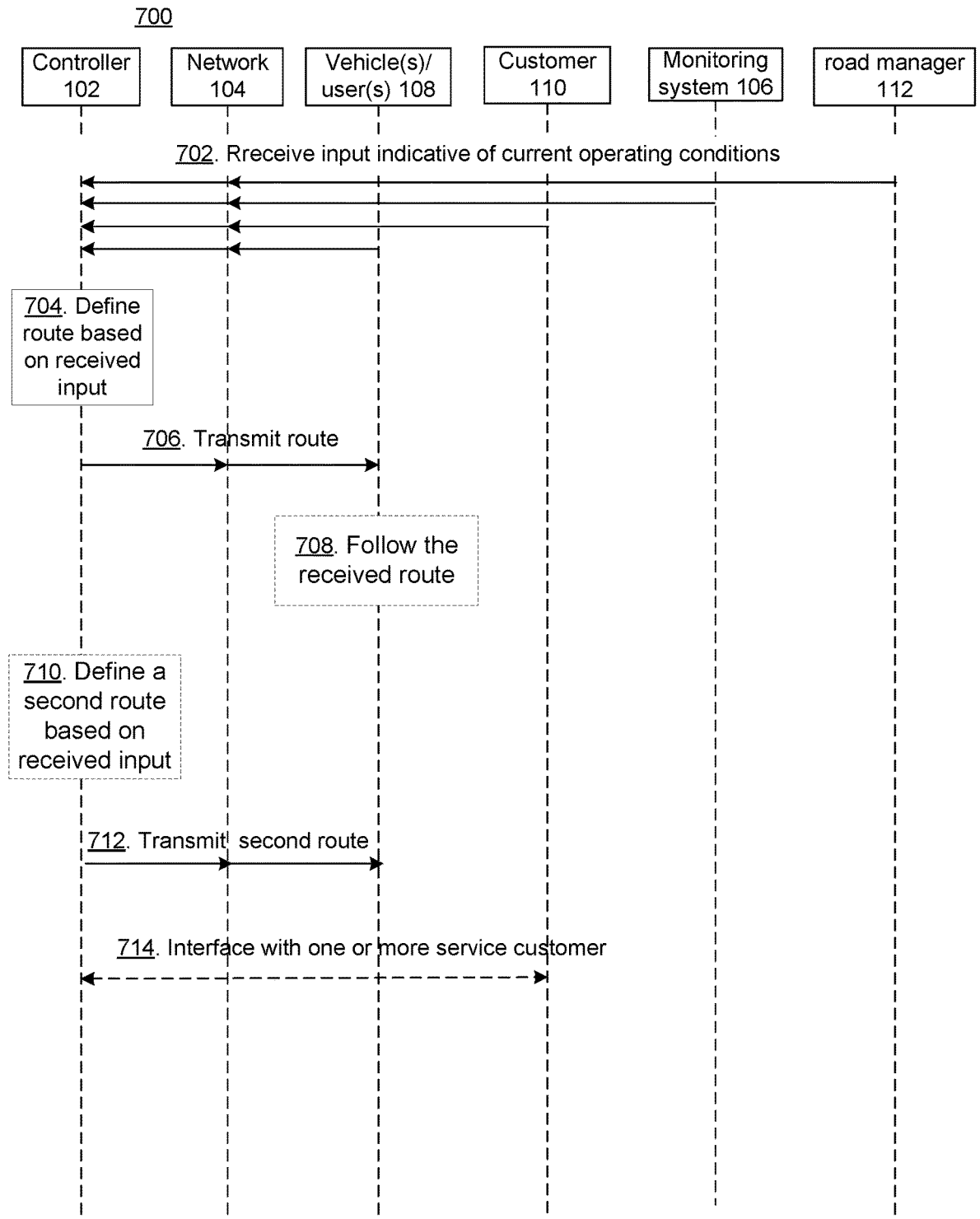
FIGS. 7A and 7B illustrate a method for facilitating navigation of a device operatively coupled to a wireless network, according to embodiments of the present invention.
Figure 7B:
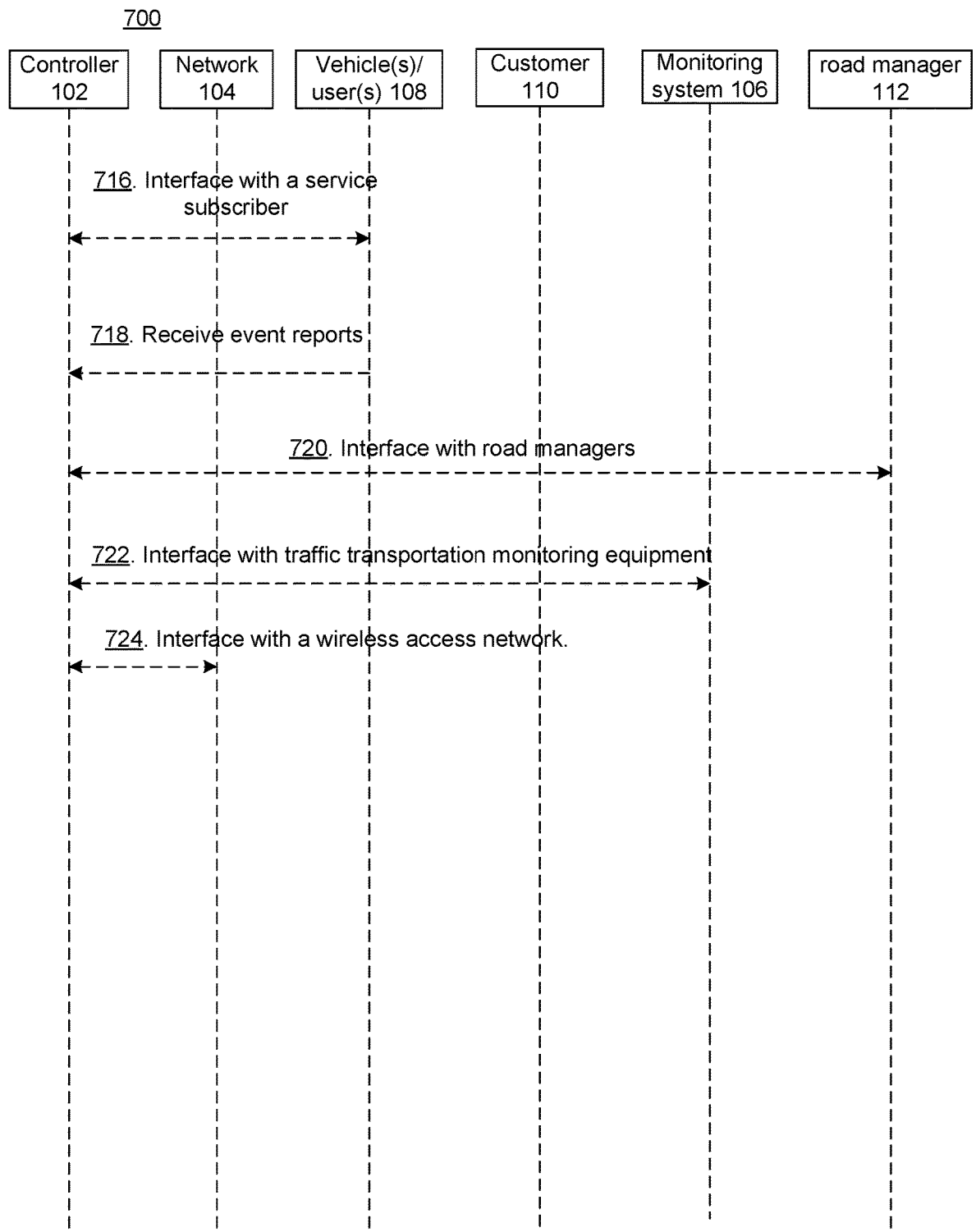

FIGS. 7A and 7B illustrate a method for facilitating navigation of a mobile device operatively coupled to a wireless network, according to embodiments of the present invention. Referring to FIG. 7A, at step 702, the automatic controller 102 obtains input from other system entities. The input indicates the current operation conditions of a physical road. As discussed elsewhere herein, monitoring systems 106 (any one or more of equipment, manager, or management function) may send information related to current operating conditions to the automatic controller 102. Similarly, road managers 112 and eROAD customer 110 may also send to the controller 102 information indicative of current operating conditions. In some embodiments, the input indicative of conditions on the physical road may be received from a manager responsible for management of the physical road, for example road managers 112, and the input may include one or more of: physical layout of the road; quality of the road; and weather-dependent road conditions. Service subscribers may further report events to the automatic controller 102, the events indicative of the current operating conditions.

In some embodiments the current operating conditions include transportation requirements of the mobile device. The transportation requirements of the mobile device include one or more of: a required speed, a required schedule, a required route, and a priority level. For example, referring to FIG. 5B, the mobile device 420 would require a larger lane size in comparison to the mobile device 422, Accordingly, each mobile device may communicate its size requirements to the automatic controller 102. Similarly, mobile device 466 would require an emergency level of service, which would be communicated to the automatic controller 102.

In some embodiments current operating conditions include one or more of traffic conditions on the physical road or traffic status information associated with the physical road, which may include one or more: traffic congestion conditions; occurrence of an obstacle; and a requirement to accommodate one or more higher-priority mobile devices. For example, referring to FIG. 5C, the mobile device 435 having experienced the congestion zone 450 will report the experienced traffic to automatic controller 102. Similarly, mobile device 466 of FIG. 5D would communicate its higher priority level service to the automatic controller 102 to accommodate a more efficient route.

In some embodiments, the automatic controller 702 may receive traffic status information from one or more stationary monitors, for example, monitoring system 106, deployed along the physical road. In some embodiments, the traffic status information may be determined based on information from the one or more monitors, and the conditions may indicate traffic conditions on the physical road. The traffic status information may include one or more of traffic congestion conditions and occurrence of an obstacle as discussed herein.

At step 704, the automatic controller 102 determines (e.g. defines) a route along the physical road based at least in part on the input, and the route is to be followed by the mobile device. Example embodiments of defining routes by the automatic controller 102 are discussed elsewhere herein including with reference to FIGS. 5A, 5B, 5C and 5D. The automatic controller can determine one or more routes in this manner. The one or more or routes may each include a respective virtual lane defining respective routes along the physical road, at least one of the virtual lanes to be followed by the mobile device.

In some embodiments the current operating conditions are reported to the automatic controller 102 via the wireless network 104 based on information generated by one or more of: mobile devices on the physical road; monitoring equipment deployed along the physical road (monitoring system 106); a customer for mobile devices travelling on the physical road; and a manager for the physical road (road managers 112). Example embodiments are discussed elsewhere herein including with respect to step 202 of FIG. 2 and step 302 of FIG. 3 for periodic or on-demand collection of data indicative of current operating conditions.

At step 706, having determined the route for the mobile device, the automatic controller communicates the route (e.g. one or more virtual lanes) to the navigation system of the mobile device via the wireless network. Example embodiments of communicating the route to the navigation system of the mobile device are discussed elsewhere herein including with respect to FIG. 5C, in releasing the mobile device 436 from the congestion zone 450. Further embodiments of communicating the route are discussed elsewhere herein including with respect to FIG. 5D in updating the mobile device 466's route from lane 462 to lane 464.

In some embodiments, an indication of the determined route (one or more virtual lanes) may be communicated to the mobile device. In some embodiments, the indication of the determined one or more virtual lanes may include one or more usage requirements for at least one of the virtual lanes. The usage requirements can indicate, for example, what criteria a mobile device is require to satisfy in order to use a virtual lane. Such criteria may include vehicle width criteria, minimum or maximum speeds, priority levels, etc.

In some embodiments, the route that is communicated at step 706 is communicated as part of a dynamically updated map including the route traversing the physical road. Example embodiments of the route being communicated as part of a dynamic map, being the eROAD MAP, has been discussed throughout the disclosure, and particularly at step 202 of FIG. 2, release of mobile device 436 in FIG. 5C, and provisioning of emergency level of service in FIG. 5D.

In some embodiments the map communicated to subscribed mobile devices defines parallel lanes that traverses the physical road. Each of the lanes may be dynamically updated according to the changing operating condition for the physical road. Example embodiments are discussed elsewhere herein including with respect to FIG. 5A, in which lanes 406 and 408 were defined for mobile devices of the same size, whereas lanes 416 and 418 of FIG. 5B were defined for mobile device of different sizes. Accordingly, the input obtained by the automatic controller 102 may indicate that the current operating conditions for a physical road requires a change in lanes for accommodating different sizes of mobile devices. If so, the automatic controller 102 may dynamically update the maps, and accordingly the lane widths may be adjusted.

In some embodiments, the route defined by the automatic controller 102 is expressed as a line on the dynamically updated map. The line may be expressed as a set of geographic point locations. Example embodiments are discussed elsewhere herein including with respect to FIG. 4, 5A, 5B, 5C, 5D, in which routes were expressed as virtual lines 1 and 2 in each of the corresponding figures.

In some embodiments, at step 708 the mobile device's navigation system, having obtained the route from the automatic controller, may generate output causing the mobile device to follow the route. The output can include steering control signals, for example. In some embodiments, the step of communicating the route at step 706 includes communicating a series of physical location makers or coordinates along the route (e.g. in the form of a virtual line to be followed). In some embodiments the navigation system is configured to monitor physical location of the mobile device and guide the mobile device along the series of physical location markers. Example embodiments are discussed elsewhere herein including with respect to FIG. 4, in which the mobile device 488's route is defined by a series of physical location markers, which may be the location point coordinates 486, and the mobile device's navigation system monitors the mobile device's physical location and guide the mobile device along its route.

In some embodiments, the route defines a lane to be followed by multiple mobile devices in succession, the lane being substantially free of physical obstacles and non-intersecting with one or more other lanes along the physical road. In some embodiments, the route is determined to provide for the lane having at least a specified width for accommodating a predetermined size of mobile device. For example, lane 406 of FIG. 5A determines the route to be followed by mobile devices 409 and 413, which may have the same priority of service and size requirement.

Similarly, in some embodiments, the route is dynamically defined so that the lane avoids a physical obstacle on the physical road, or so that the lane avoids intersecting with one or more other dynamically defined lanes along the physical road.

In some embodiments, at step 710, the automatic controller 102 may define a second route along the physical road based at least in part on the input obtained, the second route to be followed by a second mobile device. In some embodiments, at step 712, the automatic controller 102 may communicate the second route to a navigation system of the second mobile device via the wireless network. In some embodiments the route defines a first virtual lane to be followed by multiple mobile devices, the first virtual lane being substantially free of physical obstacles and non-intersecting with one or more other lanes along the physical road. In some embodiments, the second route defines a second virtual lane to be followed by multiple other mobile devices, the second virtual lane being substantially free of physical obstacles and non-intersecting with one or more other lanes along the physical road, including the first virtual lane. Example embodiments are discussed elsewhere herein including with respect to FIG. 5A in which lane 406 is defined as the route for mobile devices 409 and 413, and lane 408 is defined as the route for mobile devices 410 and 411. The first routes, being virtual lane 406 is substantially free of physical obstacles, and the second route, being lane 408 is also substantially free of physical obstacles and non-intersection with one or more other lanes along the physical road, including the first lane 406.

In some embodiments, the automatic controller may dynamically adjust the one or more virtual lanes in response to further input obtained following the input at 1102, the further input indicative of one or more of: subsequent conditions on the physical road; subsequent traffic status information associated with the physical road; and subsequent requirements of the mobile device.

In some embodiments, the automatic controller may configure a virtual traffic control signal for controlling traffic at an intersection involving at least one of the virtual lanes. The automatic controller may further communicate an indication of the virtual traffic control signal to the vehicle(s), user(s), or mobile devices 108. The automatic controller can implement the virtual traffic control signal for multiple virtual lanes, at a point where these virtual lanes intersect, in a coordinated manner. This allows vehicles to physically move past one another in a coordinated manner via a controlled intersection, with physical traffic lights being replaced by virtual traffic lights.

In some embodiments, at step 714, the automatic controller 102 may interface with one or more service customer 110 responsible for one or more multiple mobile devices. The automatic controller 102 may obtain from the service customer 110 one or more of: identifiers of the mobile devices; planned paths and schedules of the mobile devices; and requested service level for the mobile devices. The interfacing may include determining a service level for each respective mobile device and defining routes for each mobile device based at least in part on their service level. Example embodiments are discussed elsewhere herein including with respect to FIG. 1 in which automatic controller interfaces 111 with the service customer 110.

In some embodiments, the automatic controller 102 may receive additional input indicative of requirements of one or more additional mobile devices, the input indicative of the requirements of the mobile device and the additional input may be received from a single customer 110 responsible for the mobile device and the additional mobile devices. In some embodiments, the one or more lanes may be determined based at least in part on the additional input. In some embodiments, the additional input received may indicate one or more of: a schedule, and a service level for the mobile device and the additional mobile devices. In this manner, a service customer responsible for multiple mobile devices may provide input, and the controller may define virtual lanes in order to satisfy requirements of this service customer. For example, a service customer may indicate a fleet of vehicles and a travel schedule for the vehicles, and the controller may define virtual lanes to accommodate the fleet of vehicles. These virtual lanes may be dedicated to the fleet of vehicles in some embodiments where the customer has high priority. The virtual lanes may alternatively be shared with other mobile devices.

In some embodiments, referring to FIG. 7B, at step 716, the automatic controller 102 may interface with a service subscriber 108 representing the mobile device. The automatic controller 102 may obtain from the service subscriber 108 registration information for the mobile device including one or more of: a service quality, an identifier of the mobile device, a planned travel path, a transportation schedule of the mobile device, and a requested service level for the mobile device. This may involve determining a service level for the mobile device and transmitting a map including lane usage policy and decryption key information for decryption of the map. In some embodiments, the automatic controller may perform registration operations for the vehicle(s), user(s), or mobile device 108. In some embodiments the registration operation may include obtaining the requirements of the mobile device. In some embodiments, the automatic controller may communicate with the mobile device 108, one or more usage requirements for at least one of the virtual lanes and a time window during which the virtual lanes can be used.

In some embodiments, at step 718, the automatic controller 102 obtains event reports from one or more of service subscriber or mobile device 108 as part of input indicative of current operating conditions. Example embodiments are discussed elsewhere throughout herein including with respect to FIG. 1 in which automatic controller interfaces 109 with the service subscriber 108. Event reports may trigger a reselection or re-determination of a route or a characteristic of a route, and further may trigger a communication of the reselected or re-determined route or characteristic to one or more mobile devices.

In some embodiments, the automatic controller 102 may receive the event reports form mobile devices 108 and re-determine one or more virtual lanes based on the received event reports. The automatic controller may then communicate the re-determined one or more virtual lanes to the mobile device 108.

In some embodiments, at step 720, the automatic controller 102 may interface with a manager 112 for road operation or road construction. The automatic controller 102 may obtain information indicative of road conditions as part of its current operating conditions. Example embodiments are discussed elsewhere throughout herein including with respect to FIG. 1 in which automatic controller interfaces 113 with the road managers 110.

In some embodiments, at step 722, the automatic controller 102 may interface with the traffic transportation monitoring equipment. The automatic controller 102 may obtain information indicative of road conditions as part of its current operating conditions. Example embodiments are discussed elsewhere throughout herein including with respect to FIG. 1 in which automatic controller interfaces 107 with the monitoring system 106.

In some embodiments, at step 724, the automatic controller 102 may interface with a wireless access network 104 to obtain input indicating the current operations, to manage registration of the mobile device to obtain navigation services, or a combination thereof. Example embodiments are discussed elsewhere throughout herein including with respect to FIG. 1 in which automatic controller interfaces 105 with the wireless access network 104.

In some embodiments, the automatic controller 102 may obtain input indicative of conditions on physical road, traffic status information, and requirement of mobile device from system entities via wireless access network 104. The automatic controller 102 may communicate with the mobile device also via the wireless access network 104. In some embodiments, the automatic controller 102 may communicate an indication of determined one or more virtual lanes as part of a dynamically updated electronic map, and the wireless access network may be configured to perform one or more of: repeatedly multicasting the indication of the electronic map to a plurality of mobile devices including the mobile device; forwarding registration messages between the mobile device and the controller; and communicating event reports from the mobile device to the controller.

Figure 8:
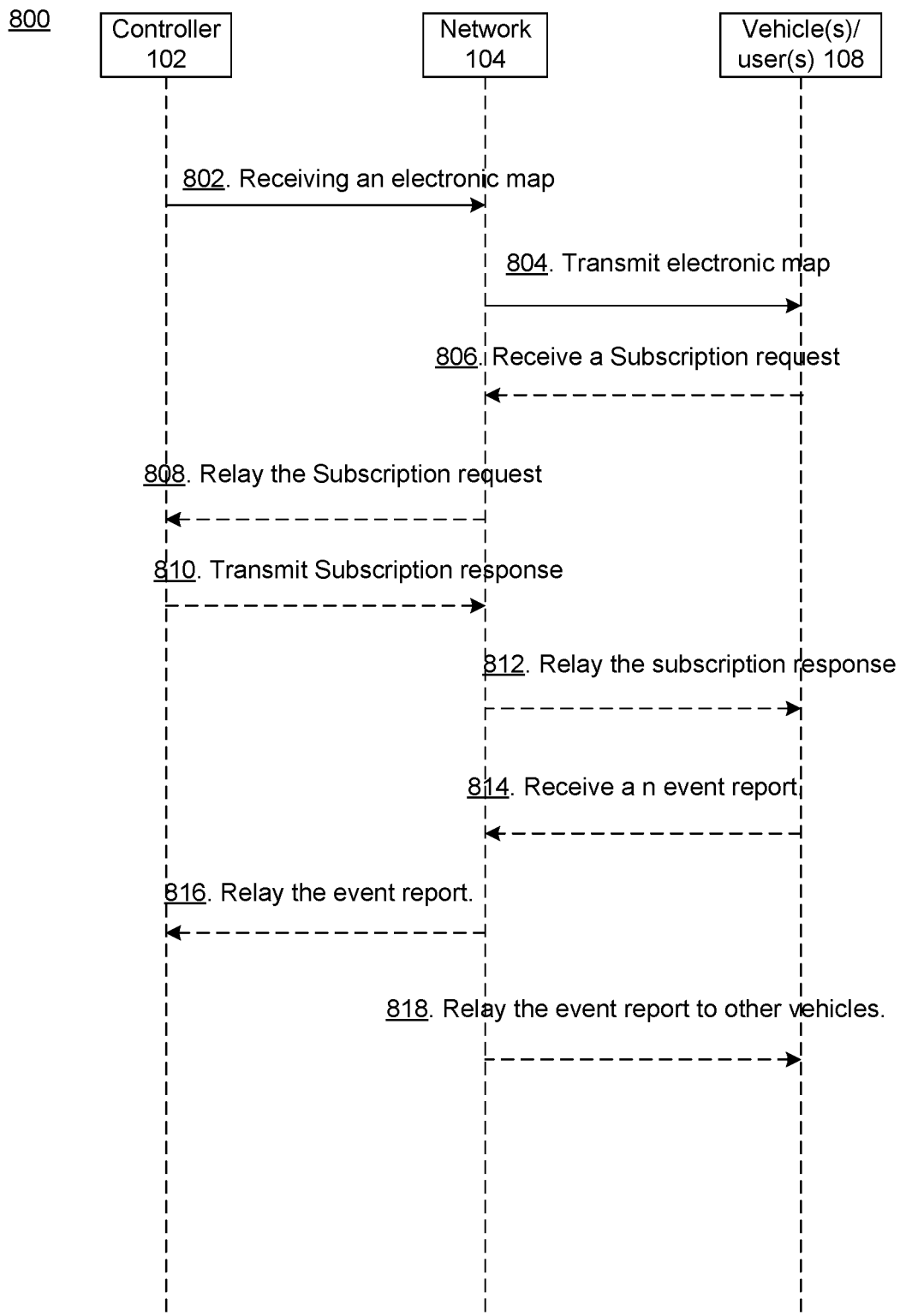
FIG. 8 illustrates a method by a wireless network for facilitating navigation of mobile devices operatively coupled to the wireless network and subscribed to a navigation service, according to embodiments of the present invention.

FIG. 8 illustrates a method by a wireless network for facilitating navigation of mobile devices operatively coupled to the wireless network and subscribed to a navigation service, according to embodiments of the present invention. FIG. 8 further describes the potential steps involved in step 202 of FIG. 2. Referring to FIG. 8, at step 802, the wireless access network 104 obtains an electronic map defining one or more dynamically defined routes along a physical road. Example embodiments are discussed elsewhere herein including step 202 of FIG. 2 in which the wireless access network 104 obtains encrypted eROAD MAP from the automatic controller 102.

At step 802, the wireless network 104 periodically multicasts the obtained electronic map to the mobile devices. Example embodiments are discussed elsewhere herein including step 202 of FIG. 2 in which the wireless access network 104 multicasts the obtained encrypted eROAD MAP from the automatic controller 102 to eROAD subscribers 108, which may be mobile devices.

In some embodiments, at step 806, the wireless network 104 may obtain a request from a new mobile device to subscribe to the navigation service. Example embodiments are discussed elsewhere herein including step 204 of FIG. 2 in which the wireless access network 104 obtains a request from a new mobile device subscribing to the eROAD service.

In some embodiments, at step 808, the wireless network 104 may relay the request to the automatic controller 102 for the navigation service. Example embodiments are discussed elsewhere herein including step 202 of FIG. 2 in which the wireless network 104 relays the request for an eROAD service obtained from the new mobile device to the automatic controller 102.

In some embodiments, at step 810, the wireless network 104 may obtain a response to the request from the automatic controller 102. At step 812, the wireless network 104 may relay the response obtained to the new mobile device.

In some embodiments, at step 814, the wireless network 104 may obtain from one of the mobile devices 108, an event report indicative of a change in operating conditions along the physical road. In some embodiments, at step 816, the wireless network 104 may then relay the event report to a controller 102 for the navigation service. In some embodiments, at step 818, the wireless network 104 optionally relays the event report obtained to one or more other ones of the mobile devices. Example embodiments are discussed elsewhere herein including step 202 of FIG. 2 in which the wireless network 104 obtains event reporting from service subscriber 108. The event relates to changes to the operating conditions along the physical road. The wireless network 104 relays the obtained event report to the automatic controller 102, and optionally to other service subscribers.

Figure 9:
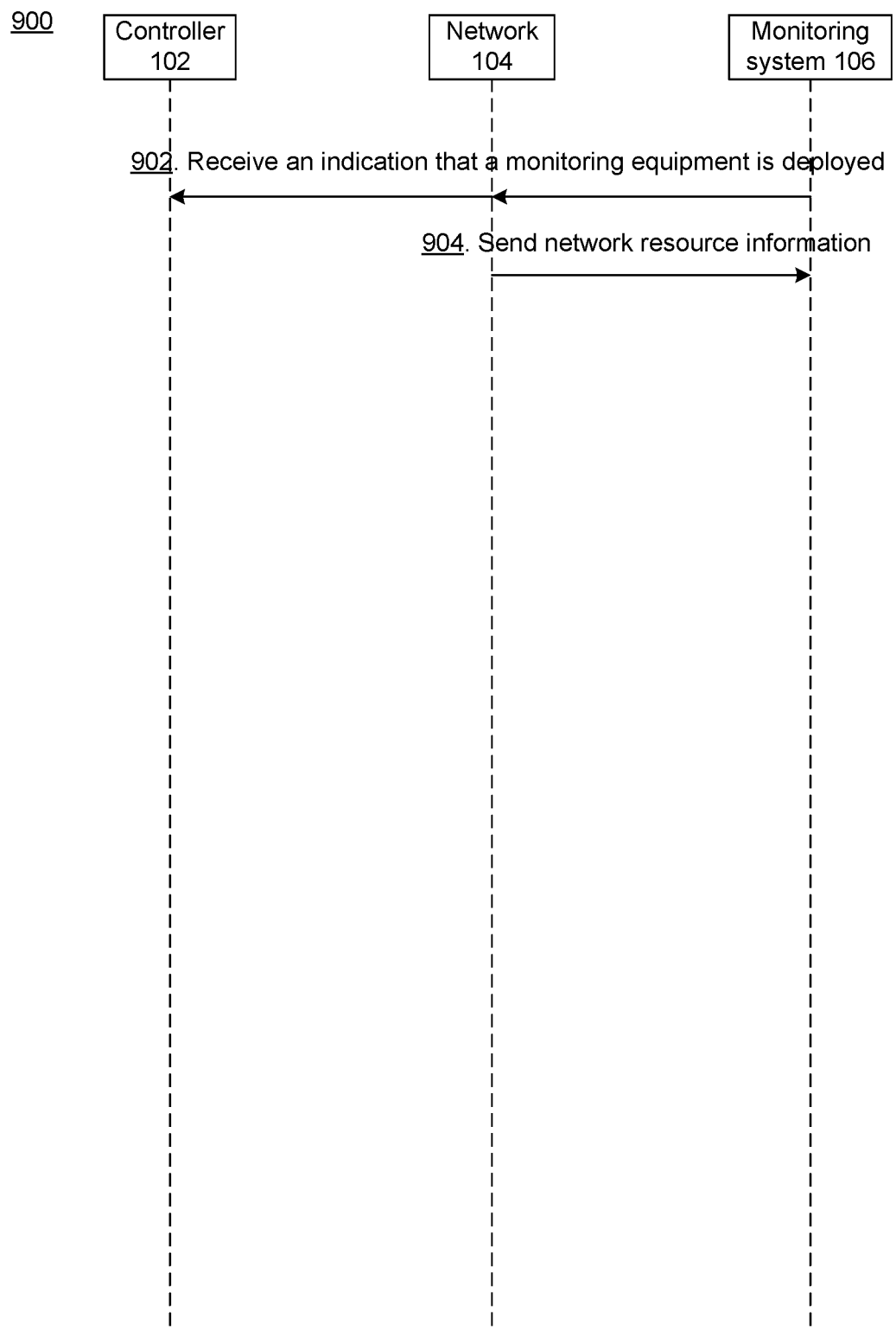
FIG. 9 illustrates a method for facilitating navigation of mobile devices operatively coupled to a wireless network and subscribed to a navigation service, according to embodiments of the present invention.

FIG. 9 illustrates a method for facilitating navigation of mobile devices operatively coupled to a wireless network and subscribed to a navigation service, according to embodiments of the present invention. Referring to FIG. 9, at step 902, the method includes receiving an indication of traffic transportation monitoring equipment deployed along a physical road and registered to provide information indicating operating conditions along the physical road to a controller for the navigation service. Example embodiments are discussed elsewhere herein including monitoring system 106 in FIG. 5C collecting data indicative of congestion zone 450, and communicating the collecting data to the automatic controller 102 through interface 107 (referring to FIG. 1).

At step 904, the method includes assigning wireless communication resources for use by the traffic transportation monitoring equipment to wirelessly transmit said information to the controller. Example embodiments are discussed elsewhere herein including step 302 of FIG. 3, in which network resources are assigned to the monitoring system 106 to periodically or on-demand collect data indicative of operating conditions.

Figure 10:
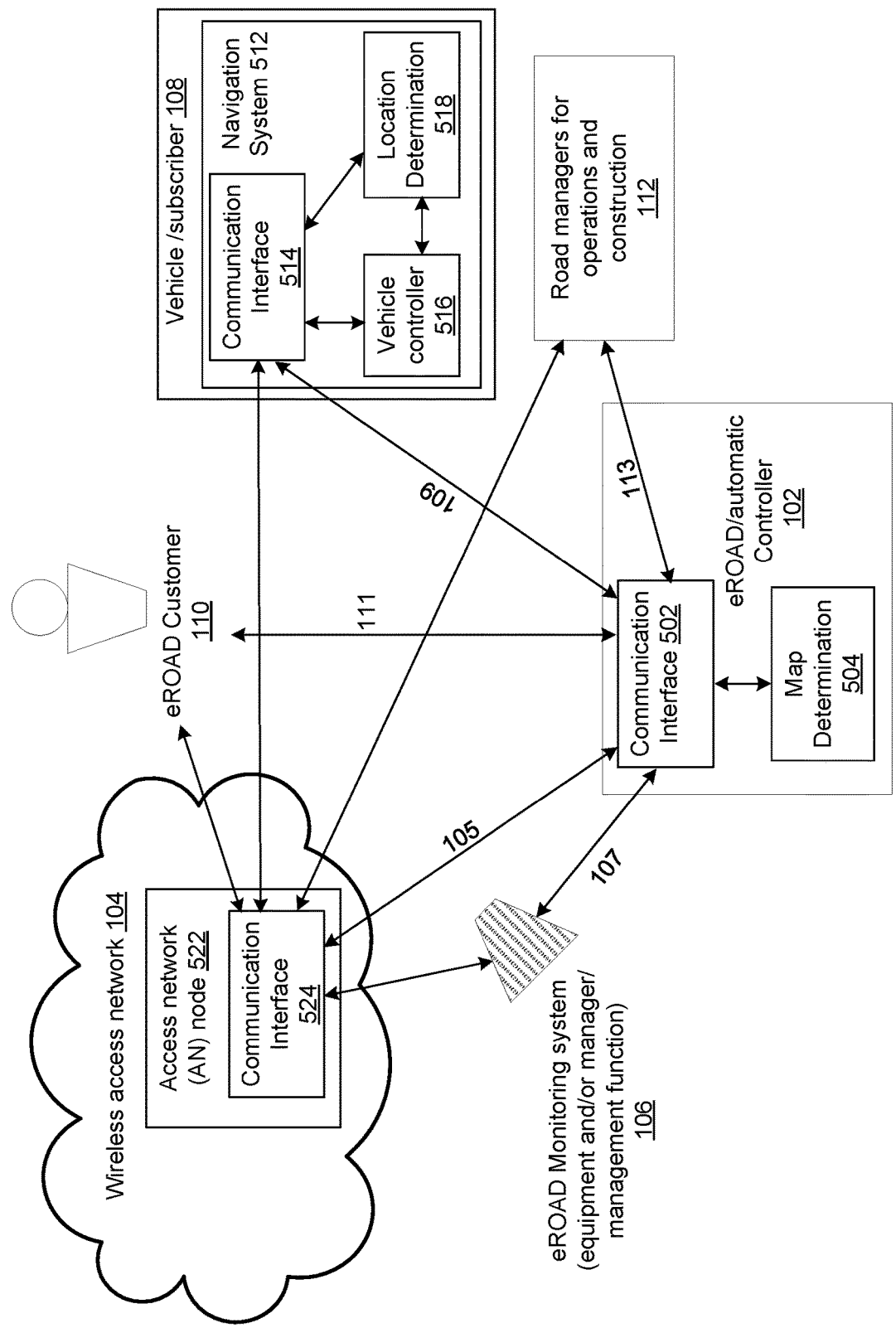
FIG. 10 illustrates another architecture of the eROAD system, according to embodiments of the present invention.

FIG. 10 illustrates an architecture of the eROAD system, according to embodiments of the present invention.

Referring to FIG. 10, the eROAD automatic controller 102 may include a communication interface 502 for interfacing with eROAD system entities including the wireless access network 104 through interface 105, eROAD customer or service customer 110 through interface 111, mobile device or mobile subscriber 108 through interface 109, road managers 112 through interface 113, and the eROAD monitoring system 106 through interface 107.

The controller 102 may also include a Map determination function 504. The communication interface 502 communicates with the Map determination function 504. The map determination function is configured to generate, update or both generate and update one or more eROAD MAP as discussed herein, including determining virtual lanes. The generation may be based on information obtained, customer or subscriber requirements, etc. Generated maps are communicated to one or more of mobile devices or subscribers 108 via the communication interface 502.

The wireless access network 104 may comprise an access network (AN) node 522. The AN node may comprise a communication interface 524 for interfacing with other system entities including the automatic controller 102, eROAD service customer 110, mobile device or subscriber 108, road managers 112 and the eROAD monitoring system 107. In various embodiments, some or all communications between one or more pairs of system entities pass through the wireless access network. In some embodiments, some or all communications between one or more pairs of system entities may bypass the wireless network.

The mobile device or subscriber 108 may comprise a navigation system 512. The navigation system 512 includes a communication interface 514, a mobile device controller 516, and a location determination unit 518. The communication interface 514 may send information to and obtain information from the wireless access network 104. The communication interface 514 may send to and obtain information from the communication interface 502. The information may include eROAD MAP, updates to the eROAD MAP, reports of event, and other information as discussed herein. The communication interface 514 may communicate with the mobile device controller 516 and the location determination unit 518 to send and obtain the said information. The mobile device controller 516 may control the route of the mobile device 108 according to information obtained from or sent from the communication interface 514 and location determination unit 518, as discussed in embodiments herein. The location determination unit 518 tracks the mobile device's location and communicates the mobile device's location with the communication interface 514 and the mobile device controller 516. The mobile device controller 516 may send signals to the mobile device to control speed and direction thereof, either directly or indirectly. Indirect control can include providing instructions to a driver of the mobile device, for example.

Figure 11A:
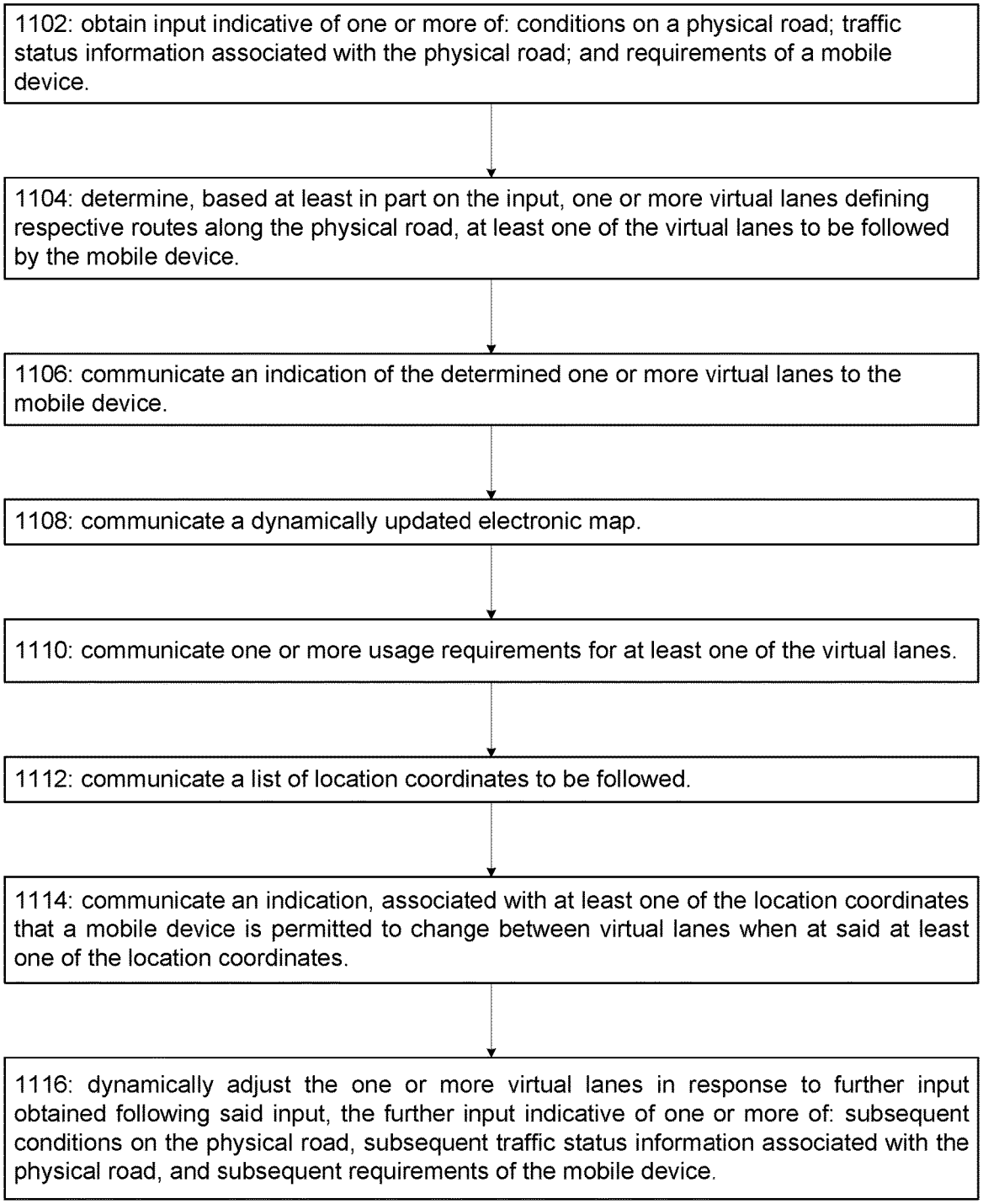
FIGS. 11A and 11B illustrate a method for facilitating navigation, according to an embodiment of the present invention.
Figure 11B:
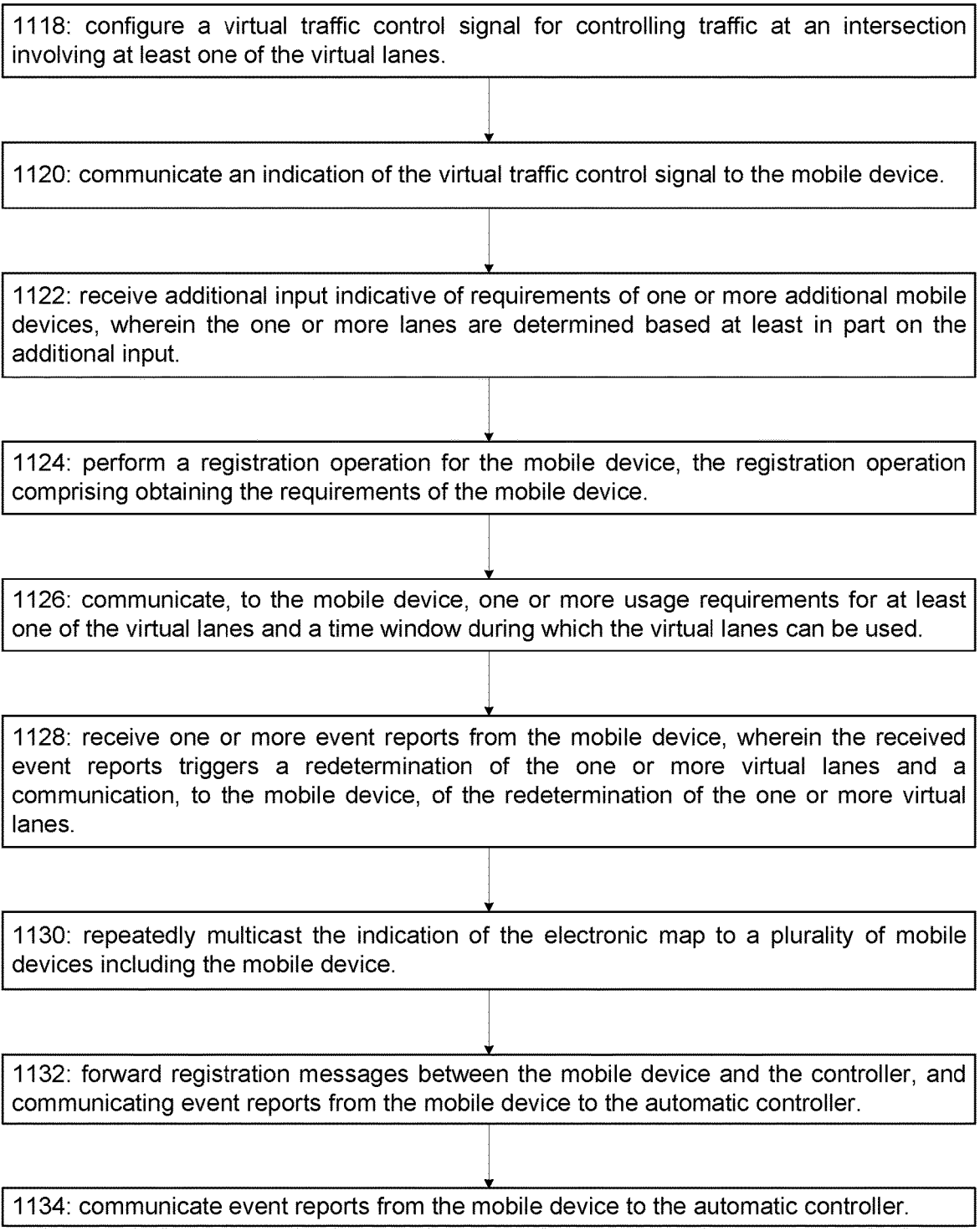

FIGS. 11A and 11B illustrate a method for facilitating navigation, according to an embodiment of the present invention. The method 1100 may be performed by one or more of system entities including automatic controller 102, the wireless access network 104, customer 110, vehicle(s), subscriber(s) or mobile device(s) 108, monitoring equipment 106, and road managers 112. Various embodiments of the present invention also provide for computer devices which are configured to perform operations corresponding to the present method, or other methods as described herein, or a combination thereof.

At 1102, the method may include obtaining input indicative of one or more of: conditions on a physical road, traffic status information associated with the physical road and requirements of a mobile device. In some embodiments, the input indicative of conditions on the physical road is received or obtained from a manager responsible for management of the physical road, and the input may include one or more of: physical layout of the road; quality of the road; and weather-dependent road conditions. In some embodiments the traffic status information is received from one or more stationary monitors deployed along the physical road.

In some embodiments the traffic status information is determined based on information received from the one or more monitors, and the conditions indicate traffic conditions on the physical road. In some embodiments, the traffic status information includes one or more of: traffic congestion conditions; and occurrence of an obstacle.

In some embodiments, the obtaining input at 1102 may be performed via a wireless access network 104. In some embodiments, the obtaining traffic status information is performed via the wireless access network 104 via assigned wireless resources.

At 1104, the method may further include determining, based at least in part on the input received at 1102, one or more virtual lanes defining respective routes along the physical road, at least one of the virtual lanes to be followed by the mobile device.

At 1106, the method may further include communicating an indication of the determined one or more virtual lanes to the mobile device. In some embodiments the communicating with the mobile device is performed via a wireless access network.

In some embodiments, at 1108 or as part of 1106, the indication of the determined one or more virtual lanes may be communicated as part of a dynamically updated electronic map. In some embodiments, the indication of the determined one or more virtual lanes comprises one or more usage requirements for at least one of the virtual lanes, and the method may further include, at 1110 or as part of 1106, communicating the one or more usage requirements. In some embodiments, the indication of the determined one or more virtual lanes comprises a list of location coordinates to be followed, and the method may further include, at 1112 or as part of 1106, communicating the list of location coordinates.

In some embodiments, the indication includes an indication, associated with at least one of the location coordinates, that a mobile device is permitted to change between virtual lanes when located at said at least one of the location coordinates. At 1114 or as part of 1106, the method may further include communicating the indication that the mobile device is permitted to change between virtual lanes.

In some embodiments, at 1116, the method may further include dynamically adjusting the one or more virtual lanes in response to further input obtaining following said input, the further input indicative of one or more of: subsequent conditions on the physical road; subsequent traffic status information associated with the physical road; and subsequent requirements of the mobile device.

In some embodiments, at 1118 referring to FIG. 111B, the method may further include configuring a virtual traffic control signal for controlling traffic at an intersection involving at least one of the virtual lanes. In some embodiments, at 1120, the method may further include communicating an indication of the virtual traffic control signal to the mobile device.

In some embodiments, at 1122, the method may further include receiving additional input indicative of requirements of one or more additional mobile devices. In some embodiments, the input indicative of the requirements of the mobile device and the additional input are received from a single customer responsible for the mobile device and the additional mobile devices. In some embodiments, the one or more lanes are determined based at least in part on the additional input. In some embodiments, the input and the additional input indicate one or more of: a schedule; and a service level for the mobile device and the additional mobile devices.

In some embodiments, at 1124, the method may further include performing a registration operation for the mobile device, the registration operation including obtaining the requirements of the mobile device. In some embodiments, the requirements of the mobile device include one or more of: a service quality, a planned travel path, and a transportation schedule.

In some embodiments, at 1126, the method may further include communicating, to the mobile device, one or more usage requirements for at least one of the virtual lanes and a time window during which the virtual lanes can be used.

In some embodiments, at 1128, the method may further include receiving one or more event reports from the mobile device. In some embodiments the receiving one or more event reports may trigger a re-determination of the one or more virtual lanes and a communication, to the mobile device, of the re-determination of the one or more virtual lanes.

In some embodiments, the obtaining one or more inputs or additional inputs and the communicating with the mobile device may be performed via a wireless access network. In some embodiments the indication of the determined one or more virtual lanes may be communicated as part of a dynamically updated electronic map. In some embodiments, at 1130, the method may further include repeatedly multi-casting the indication of the electronic map to a plurality of mobile devices including the mobile device. In some embodiments at 1132, the method may further include forwarding registration messages between the mobile device and the automatic controller. In some embodiments, at 1134 the method may further include communicating event reports from the mobile device to the automatic controller. In some embodiments, the wireless access network 104 may be configured to perform one or more of: repeatedly multi-casting the indication of the electronic map to a plurality of mobile devices including the mobile device, forwarding registration messages between the mobile device and the automatic controller, and communicating event reports from the mobile device to the automatic controller.

The eROAD solution discussed in embodiments herein may be useful and applicable to various future use cases of the self-driving systems. For example, the eROAD system may be useful in the case of poor visual sensing, particularly when visual sensors or sensing are unavailable or may not function properly, for example in bad weather or in a tunnel.

Also, the eROAD system may be useful for alleviate or releasing traffic congestion as discussed in embodiments herein. The automatic controller 102 may, on-demand, generate and broadcast to mobile devices eROAD MAPs to release mobile devices from traffic congestion. The generated eROAD MAPs updates the mobile devices' routes by changing lanes at appropriate locations along the physical road. Accordingly, lanes, represented by lines on the eROAD MAP, may be automatically designed and flexibly implemented based on the changing operating conditions to allow for effective lane designs for peak and non-peak hours, avoiding and alleviating traffic congestion. Similarly, the eROAD system may facilitate temporary road construction by allowing temporary designs of eROAD MAP and automatic broadcasting to mobile devices accommodating any road maintenance or construction. The navigation system in the mobile devices can readily implement the new routes defined in the temporary eROAD MAP obtained.

Further, the eROAD system may facilitate the prioritization of different types of mobile devices for effective navigation where circumstance requires. For example, in the case of emergency service, such as an ambulance, fire trucks or the police, the automatic controller 102 may design temporary eROAD MAPs and multicast to all relevant mobile devices to allocate specific lanes or portions thereof, for routing the higher priority mobile devices, while allocating separate other lanes for medium or lower priority mobile devices. Accordingly, eROAD MAPs may be designed to reflect the priority level of the mobile devices.

In various use cases discussed above, the mobile devices use the eROAD MAP by following the assigned route defined in the obtained eROAD MAP while monitoring their current location to guide the mobile device along the assigned route.

It should be noted that the eROAD system is not limited to self-driving cars, but also applicable to control the path movement of robots and other like-devices that may use such a system.

In order to navigate a mobile device such as a vehicle to follow a defined route, it is desirable for the mobile device to have an indication of its location. Various location determination technologies can be used for this purposes, such as Global Positioning Systems (GPS). In some embodiments, the mechanisms as described in one or more of co-pending U.S. Patent Application Nos. 62/971,077, filed Feb. 6, 2020, 62/971,102, filed Feb. 6, 2020, and 62/976,937, filed Feb. 14, 2020. All of these patent applications are incorporated herein by reference. It is understandable that following embodiments can be technically combined with the embodiments above.

An aspect of the disclosure provides for a method. The method includes obtaining input indicative of one or more of conditions on a physical road, traffic management information associated with the physical road, and requirements of a mobile device. The method further includes selecting at least one characteristic of a route along the physical road based at least in part on the input, the route to be followed by the mobile device. The method further includes communicating the selected characteristic of the route to the mobile device.

In some embodiments, the at least one characteristic of the route corresponds to one or more lanes traversing the physical road in a map, the route includes at least one of the one or more lanes. In some embodiments, the at least one characteristic of the route corresponds to a line indicating the route traversing the physical road in a map, the route includes a set of geographic point locations along the line. In some embodiments, the at least one characteristic of the route includes a use policy or service quality level associated with the route. In some embodiments, the service quality level indicates one or more of: an emergency level required for usage of the route, a range of speeds required for traversing the route, and a width range allowed for mobile devices traversing the route. In some embodiments, the at least one characteristic defines a quality of service level required for mobile devices traversing the route.

In some embodiments, each lane or each line in the map belongs to one or more classification, each classification corresponding to one or more of the at least one characteristic.

In some embodiments, the classification includes one or more characteristic of: a speed limit, a quality level, a route sharing allowance, a width size, a lane ID, or a line ID.

In some embodiments, the method further includes selecting, by the mobile device, the route by matching the received characteristic to at least one specific classification and selecting the one or more lane or the line from a set of lanes or lines that belongs to the specific classification. In some embodiments, the selected characteristic of the route is communicated as part of a map including the route traversing the physical road.

In some embodiments, the map is an updated map including one or more updated lanes traversing the physical road.

In some embodiments, the requirements of the mobile device is received from the mobile device and include one or more of: a required speed of the mobile device, a required schedule of the mobile device, a required route of the mobile device, physical characteristics of the mobile device, and a priority level for the mobile device.

In some embodiments, the conditions is received from one or more monitors or obtained based on information from the one or more monitors, the conditions including traffic conditions on the physical road. In some embodiments, the conditions include one or more of: traffic congestion conditions, occurrence of an obstacle, occurrence of road construction, and a requirement to accommodate one or more higher-priority mobile devices. In some embodiments, the method further includes reporting, by the one or more monitors, the conditions based on one or more of: mobile devices on the physical road, monitoring equipment deployed along the physical road, a customer for mobile devices travelling on the physical road, and a manager for the physical road.

In some embodiments, the traffic management information associated with the physical road is received from a manager responsible for a management of the physical road and includes management requirements from the manager. In some embodiments, the traffic management information is received together with a map indicating the physical road, each of the traffic management information corresponding to one or more physical road.

In some embodiments, the communicating further includes transmitting the selected characteristics of the route to the mobile device via a navigation system responsible for determining the route according to the selected characteristics and enabling the mobile device to follow the determined route.

In some embodiments, the selected characteristics of the route indicate a series of physical location markers along the route, and the mobile device being guided to go along the series of physical location markers.

In some embodiments, the selected characteristics of the route indicates one or more of: sharing of the route between multiple mobile devices is allowed or not, free of physical obstacles in the route, non-intersecting with one or more other routes, or a width for accommodating a predetermined size of the mobile device.

In some embodiments, the communication with the mobile device is via a wireless network.

In some embodiments, the method further includes getting the mobile device registered in response to a registered request received from the mobile device or in response to information of the mobile device received from an apparatus responsible for managing the information of the mobile device.

In some embodiments, the information of the mobile device includes one or more of: identifier of the mobile device, one or more planned path and schedule of the mobile device, and a service level requested for the mobile device. In some embodiments, getting the mobile device registered includes determining a service level based on information received from the mobile device. In some embodiments, the method further includes sending a registration response indicative of one or more of: a service level assigned for the mobile device, a map defining the route, a time window in which one or more characteristics of the route are valid, and a key for use in decrypting location information messages transmitted to the mobile device.

In some embodiments, the method further includes receiving one or more event reports from the mobile device, the received event reports triggering a reselection of at least one characteristic of the route and a communication of the reselected characteristic of the route.

Another aspect of the disclosure provides for a method by a node of a wireless network. The method includes obtaining an electronic map defining one or more dynamically defined routes along a physical road. The method further includes periodically multicasting the electronic map to mobile devices operatively coupled to the wireless network and subscribed to a navigation service.

In some embodiments, the method further includes receiving a request from a new mobile device to subscribe to the navigation service. In some embodiments, the method further includes relaying the request to a controller for the navigation service. In some embodiments, the method further includes receiving a response to the request from the controller. In some embodiments, the method further includes wirelessly relaying the response to the new mobile device.

In some embodiments, the method further includes receiving, from one of the mobile devices, an event report indicative of a change in operating conditions along the physical road. In some embodiments, the method further includes relaying the event report to a controller for the navigation service. In some embodiments, the method further includes relaying the event report to one or more other ones of the mobile devices.

Another aspect of the disclosure provides for a method. The method includes obtaining an indication of traffic transportation monitoring equipment deployed along a physical road and registered to provide information indicating operating conditions along the physical road to a controller for a navigation service. The method further includes assigning wireless communication resources for use by the traffic transportation monitoring equipment to wirelessly transmit said information to the controller.

Another aspect of the disclosure provides for an automatic controller including a processor, a memory and a communication interface, and configured to perform a method as disclosed in any embodiment above.

Another aspect of the disclosure provides for a system including an automatic controller and a navigation system. The automatic controller including a processor, a memory and a communication interface. The automatic controller configured to obtain input indicative of one or more of: conditions on a physical road, traffic management information associated with the physical road, and requirements of a mobile device. The automatic controller further configured to select at least one characteristic of a route along the physical road based at least in part on the input, the route to be followed by the mobile device. The automatic controller further configured to communicate the selected characteristics of the route to the mobile device. The navigation system configured to generate output causing the mobile device to follow the route.

In some embodiments, the configuration to communicate the selected characteristics of the route includes configuration to communicate a series of physical location markers along the route. In some embodiments, the navigation system is further configured to monitor physical location of the mobile device and guide the mobile device along the series of physical location markers.

Another aspect of the disclosure provides for a mobile device including a processor, a memory and a communication interface. The device configured to obtain, via the communication interface, a route to be followed by the mobile device. The device further configured to generate and provide control output to cause the mobile device to follow the route.

In some embodiments, the route is one of multiple parallel lanes traversing a physical road, each of the lanes being updated according to the route.

In some embodiments, the mobile device is further configured to communicate one or more requirements to an automatic controller providing the route, said one or more requirements including one or more of: a required speed of the mobile device, a required schedule of the mobile device, a required route of the mobile device, physical characteristics of the mobile device, and a priority level for the mobile device.

In some embodiments, the mobile device is further configured to register to a navigation service prior to receiving the route.

In some embodiments, the route defines a lane to be followed by one or multiple mobile devices, the lane being free of physical obstacles and non-intersecting with one or more other routes along the physical road. In some embodiments, the route is determined to provide for a lane having at least a specified width for accommodating a predetermined size of a mobile device.

Another aspect of the disclosure provides for a monitoring equipment device. The monitoring equipment configured to monitor, using a camera or one or more sensors, current conditions on a physical road. The monitoring equipment further configured to transmit, using a communication interface, an indication of said current conditions to an automatic controller.

Another aspect of the disclosure provides for a system including an automatic controller and a monitoring equipment. The automatic controller including a processor, a memory and a communication interface. The automatic controller configured to obtain input indicative of one or more of: conditions on a physical road, traffic management information associated with the physical road, and requirements of a mobile device. The automatic controller further configured to select at least one characteristic of a route along the physical road based at least in part on the input, the route to be followed by the mobile device. The automatic controller further configured to communicate the selected characteristics of the route to the mobile device. The monitoring equipment configured to monitor, using a camera or one or more sensors, current conditions on the physical road. The monitoring equipment further configured to transmit, using a communication interface, an indication of said current conditions to an automatic controller.

As used herein, the term "about" should be read as including variation from the nominal value, for example, a 10% variation (above or below) from the nominal value. It is to be understood that such a variation is always included in a given value provided herein, whether or not it is specifically referred to.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for one or more of storing signals readable by a machine, controlling the operation of a computer according to the method of the technology or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   receiving, by a controller, a registration request from a subscriber via a first interface, the registration request is used for the subscriber to register to a service supporting autonomous driving service via a digital map, the subscriber representing a mobile device, the registration request includes: an identifier of the mobile device, requirements of the mobile device and planned path and schedule, the requirements of the mobile device includes at least one of: a required speed of the mobile device, a required schedule of the mobile device, a required route of the mobile device, physical characteristics of the mobile device, or a priority level for the mobile device;
   repeatedly obtaining, by a controller, input indicative of conditions on a physical road and traffic status information associated with the physical road;
   repeatedly determining, by the controller, the map based on a most recent instance of the input, the map including at least one virtual lane defining a route along the physical road, separately from physical road markings on the physical road, the at least one virtual lane to be followed by the mobile device wherein the at least one virtual lane is defined so as to avoid collisions with other mobile devices,
   determining, by the controller, a use policy for the at least one virtual lane based on the requirements of the mobile device and a most recent instance of the input, the use policy indicating at least one of: which virtual among the at least one virtual lane is permitted to be used; a valid time window for permitted use; a speed limitation; and an occupancy requirement;
   repeatedly communicating, by the controller, the map and the use policy to the subscriber,
   wherein the first interface is separate from another interface used for said repeatedly obtaining and said repeatedly communicating.

2. The method of claim 1, further comprising:
   configuring, by the controller, a virtual traffic control signal for controlling traffic at an intersection involving at least one of the virtual lanes; and
   communicating, by the controller, an indication of the virtual traffic control signal to the mobile device.

3. The method of claim 1, wherein the input indicative of conditions on the physical road is received from a manager responsible for management of the physical road, and wherein the input includes one or more of: physical layout of the road; quality of the road; and weather-dependent road conditions.

4. The method of claim 1, further comprising receiving, by the controller, one or more event reports from the mobile device, wherein the received event reports triggers a redetermination of the map and a communication, to the mobile device, of the map.

5. The method of claim 1, wherein the traffic status information is received from one or more stationary monitors deployed along the physical road, or are determined based on information from the one or more monitors, and wherein the conditions are indicative of traffic conditions on the physical road.

6. The method of claim 1, wherein the obtaining input and the communicating with the mobile device is performed by the controller via a wireless access network.

7. A controller comprising a processor, a memory and a communication interface and configured to:
   receive a registration request from a subscriber via a first interface, the registration request is used for the subscriber to register to a service supporting autonomous driving service via a digital map, the subscriber representing a mobile device, the registration request includes: an identifier of the mobile device, requirements of the mobile device and planned path and schedule, the requirements of the mobile device includes at least one of: a required speed of the mobile device, a required schedule of the mobile device, a required route of the mobile device, physical characteristics of the mobile device, or a priority level for the mobile device;

repeatedly obtain input indicative of conditions on a physical road; traffic status information associated with the physical road and traffic status information associated with the physical road;

repeatedly determine, the map based on a most recent instance of the input, the map including at least one virtual lane defining a route along the physical road, separately from physical road markings on the physical road, the at least one virtual lane to be followed by the mobile device, wherein the at least one virtual lane is defined so as to avoid collisions with other mobile devices, determine a use policy for the at least one virtual lane based on the requirements of the mobile device and a most recent instance of the input, the use policy indicating at least one of: which virtual among the at least one virtual lane is permitted to be used; a valid time window for permitted use; a speed limitation; and an occupancy requirement;

repeatedly communicate the map and the use policy to the subscriber, wherein the first interface is separate from another interface used for said repeatedly obtaining and said repeatedly communicating.

8. The controller of claim 7, further configured to:

configure a virtual traffic control signal for controlling traffic at an intersection involving at least one of the virtual lanes; and communicate an indication of the virtual traffic control signal to the pkaityof mobile device.

9. The controller of claim 7, further configured to receive one or more event reports from the mobile device, wherein the received event reports triggers a redetermination of the map and a communication, to the mobile device, of the map.

10. The controller of claim 7, wherein the obtaining input and the communicating with the mobile device is performed via a wireless access network.

11. A system comprising a controller and a mobile device, the controller comprising a processor, a memory and a communication interface and configured to:

receive a registration request from a subscriber via a first interface, the registration request is used for the subscriber to register to a service supporting autonomous driving service via a digital map, the subscriber representing a mobile device, the registration request includes: an identifier of the mobile device, requirements of the mobile device and planned path and schedule, the requirements of the mobile device includes at least one of: a required speed of the mobile device, a required schedule of the mobile device, a required route of the mobile device, physical characteristics of the mobile device, or a priority level for the mobile device;

repeatedly obtain input indicative of conditions on a physical road and traffic status information associated with the physical road;

repeatedly determine, the map based on a most recent instance of the input, the map including at least one virtual lane defining a route along the physical road, separately from physical road markings on the physical road, the at least one virtual lane to be followed by the mobile device, wherein the at least one virtual lane is defined so as to avoid collisions with other mobile devices, determining a use policy for the at least one virtual lane based on the requirements of the mobile device and a most recent instance of the input, the use policy indicating at least one of: which virtual among the at least one virtual lane is permitted to be used; a valid time window for permitted use; a speed limitation; and an occupancy requirement;

repeatedly communicate the map and the use policy to the subscriber, wherein the first interface is separate from another interface used for said repeatedly obtaining and said repeatedly communicating, the mobile device comprising a second processor, a second memory and a second communication interface and configured to receive the indication of the determined at least one virtual lane and to move along one of the determined at least one virtual lane.

12. The method of claim 1, wherein the at least one virtual lane is defined, based on the conditions of the physical road, the traffic status information, to accommodate travel of the plurality of mobile devices such that less congested ones of the at least one virtual lane are defined for and accessed by mobile devices with higher vehicle priority levels.

13. The method according to claim 1, wherein the map includes multiple possible virtual lanes for the mobile device selects one of which based on the requirements of the mobile device.

14. The method according to claim 1, wherein the map includes additional information to emulate a vertical traffic light at a physical intersection, the physical intersection is represented by a location mark on the map, the location mark is associated with a stop time window, during the stop time window the mobile device at the location mark is required to be at zero speed.

15. The method according to claim 1, wherein the map includes additional information for controlling lane change to allow the mobile device to switch between multiple virtual lanes defined on the map, a location mark is marked on a virtual lane of the multiple virtual lanes, lane change is permitted at the location mark.

16. The method according to claim 1, the map and the use policy are included in a registration response to the subscriber, the registration response is a response to the registration request.

17. The method according to claim 7, wherein the map includes multiple possible virtual lanes for the mobile device selects one of which based on the requirements of the mobile device.

18. The method according to claim 7, wherein the map includes additional information to emulate a vertical traffic light at a physical intersection, the physical intersection is represented by a location mark on the map, the location mark is associated with a stop time window, during the stop time window the mobile device at the location mark is required to be at zero speed.

19. The method according to claim 7, wherein the map includes additional information for controlling lane change to allow the mobile device to switch between multiple virtual lanes defined on the map, a location mark is marked on a virtual lane of the multiple virtual lanes, lane change is permitted at the location mark.

20. The method according to claim 7, the map and the use policy are included in a registration response to the subscriber, the registration response is a response to the registration request.

* * * * *